ость

United States Patent
Zhang et al.

(10) Patent No.: US 6,989,044 B2
(45) Date of Patent: Jan. 24, 2006

(54) INTERMOLECULARLY BOUND TRANSITION ELEMENT COMPLEXES FOR OXYGEN-SELECTIVE ADSORPTION

(75) Inventors: Delong Zhang, Grand Island, NY (US); Neil Andrew Stephenson, East Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/725,845

(22) Filed: Nov. 30, 2000

(65) Prior Publication Data

US 2001/0003950 A1 Jun. 21, 2001

Related U.S. Application Data

(63) Continuation-in-part of application No. 09/458,066, filed on Dec. 10, 1999.

(51) Int. Cl.
*B01D 53/047* (2006.01)

(52) U.S. Cl. .................. 95/90; 95/95; 95/96; 95/102; 95/116; 95/138; 95/140; 95/900; 96/143; 423/210; 423/219; 423/247; 502/401

(58) Field of Classification Search ............... 95/90, 95/95, 96, 97, 98, 99, 100, 101, 102, 103, 95/104, 105, 106, 116, 130, 138, 900, 140; 96/143, 144; 423/210, 219, 247; 252/182.14; 502/401
See application file for complete search history.

(56) References Cited

U.S. PATENT DOCUMENTS

| | | | |
|---|---|---|---|
| 2,450,276 A | * | 9/1948 | Fogler et al. ............... 423/219 |
| 4,343,715 A | | 8/1982 | Bonaventura et al. ...... 252/186 |
| 4,421,531 A | * | 12/1983 | Dalton et al. ................... 95/97 |
| 4,451,270 A | * | 5/1984 | Roman ......................... 95/150 |
| 4,680,037 A | * | 7/1987 | Ramprasad et al. ......... 423/219 |
| 4,735,634 A | * | 4/1988 | Norman et al. ................. 95/44 |
| 4,985,053 A | * | 1/1991 | Sugie .......................... 423/219 |
| 5,126,466 A | | 6/1992 | Ramprasad et al. ........ 556/138 |
| 5,266,283 A | * | 11/1993 | Friesen et al. ............... 423/219 |
| 5,648,508 A | * | 7/1997 | Yaghi ........................... 534/16 |
| 5,945,079 A | * | 8/1999 | Mullhaupt et al. ........... 423/219 |
| 6,183,709 B1 | * | 2/2001 | Stephenson et al. ........ 423/219 |

FOREIGN PATENT DOCUMENTS

| | | |
|---|---|---|
| EP | 0853976 A1 | 10/1983 |
| EP | 1070537 A2 | 5/1984 |
| EP | 0369713 | 5/1990 |

OTHER PUBLICATIONS

Spiratos, Mihaela et al. "Oxygen–carrying polychelates derived from bisphenolic complexes" (Chemical Abstract) Inorg. Organomet. Oligomers Polym., Proc. Iupac Symp. Macromol., 33$^{rd}$ (1991).

Spiratos, Mihaela et al. "Coordination polymers.7. Synthesis and characterization of some polychelates derived from bisphenolic complexes" (Chemical Abstract) Agnew. Makromol. Chem. (1986), 138, 159–66.

(Continued)

*Primary Examiner*—Duane Smith
*Assistant Examiner*—Jason M. Greene
(74) *Attorney, Agent, or Firm*—Mary Raynor Jimenez

(57) ABSTRACT

A process and composition for selectively adsorbing oxygen from a gaseous mixture. The chemisorption is carried out by a porous three-dimensional transition element complex comprised of intermolecularly bound TEC units, said units further comprised of at least one multidentate ligand forming at least one five- or six-membered chelate ring on each unit.

28 Claims, 11 Drawing Sheets

OTHER PUBLICATIONS

Spiratos, Mihaela et al. "Coordination polymers. VI. Preparation and characterization of some azomethine chelate polymers" (Chemical Abstract)Rev. Roum. Chim. (1984, 29(5), 457–60.

Marcu, Mihai et al. "Cordination polymers v. poly condensation of copper, nickel, cobals, and manganese resorcylaldehyde–0–phenylenediamine with terephthalic and isophthalic dischloride" (Chemical Abstract) Polym. Bull. (Berlin) (1986), 16(2–3), 103–8.

Aratake, Yuichiro et al., "Cobalt (II)–lanthanoid(III) (Ln= La, Nd, or Gd) complexes of N,N'–ethylenebis (3–carboxysalicylideneimine). (Interaction of ligating groups on the Co–Ln center" (Chemical Abstract) J. Chem. Soc., Dalton Trans. (1990), (10), 2941–5.

Pavelcik, F. et al. "Lithium '(R,S)–N, N'–ethylenediaminedisuccinatolcob altate (III) trihydrate" (Chemical Abstract) Acta Crystallogr., Sect. B (1980), B36(9), 2151–4.

* cited by examiner

TEC

Co{Me₂Ac₂H₂malen}(4-PyOLi)

Co{Me₂Ac₂H₂maltmen}(4-PyOLi)

Co{Me₂Ac₂H₂maldmen}(4-PyOLi)

Co{Me₂H₂H₂malophen}

INTERMOLECULARLY BOUND TRANSITION ELEMENT COMPLEXES FOR OXYGEN-SELECTIVE ADSORPTION

This application is a continuation-in-part of 09/458,066, filed Dec. 10, 1999.

FIELD OF THE INVENTION

This invention is directed to adsorbents used for separating gases, such as oxygen or carbon monoxide, from gaseous mixtures. More particularly, the invention is directed to the use of transition element complexes (TECs) as oxygen-selective adsorbents. Although the following description relates primarily to the use of TECs for oxygen adsorption, it should be understood that the complexes of this invention may be used for the chemisorption of other gases, as well as for heterogeneous catalyses.

BACKGROUND OF THE INVENTION

The separation and enrichment of air by the use of either rate or equilibrium selective adsorbents has been practiced for some time. Nitrogen-selective adsorbents, as typified by ion-exchanged zeolites, are nitrogen-selective at equilibrium and have been used in pressure swing adsorption (PSA) processes. Similarly, carbon molecular sieves (CMS) are used for air separation by PSA processes and rely on a rate selectivity for oxygen. Adsorbents that are oxygen-selective at equilibrium are preferred for many applications since cycle times for PSA processes are not constrained as typically required for rate selective adsorbents. Cyanocobaltates which exhibit oxygen selectivity, for example, have been described in U.S. Pat. Nos. 5,126,466; 5,208,335; 5,141,725; 5,239,090; and 5,294,418.

It has long been known that transition element centers in solid state coordination complexes undergo a reversible interaction with oxygen. Jones, et al. "Synthetic Oxygen Carriers Related to Biological Systems," *Chem. Rev.* 79, 139 (1979); Niederhoffer, et al. "Thermodynamics of Oxygen Binding in Natural and Synthetic Dioxygen Complexes," *Chem. Rev.* 84, 137 (1984); Bailes and Calvin, "The Oxygen-Carrying Synthetic Compounds. VII. Preparation," *J. Amer. Chem. Soc.*, 69, 1886 (1947); Adduci, "The Case of Aircraft $O_2$ System based on Metal Chelates," *Chemtech*, 575 (1976). Transition element complexes (TECs) are one class of materials known to react reversibily at or below ambient temperatures without breaking the oyxgen-oxygen bond. The use of TECs to selectively remove oxygen from its mixtures with other gases has been disclosed for solutions of TECs, for solid-state TECs or slurries of said solids, for TECs supported on or bound to solid supports and for TECs incorporated in zeolites and for TECs bound chemically to physical supports. Examples of solid state oxygen-selective adsorbents based on discrete TEC units include Co(salen), fluomine, and iron(II) and cobalt(II) complexes of the so-called "picket-fence porphyrin." Collman, "Synthetic Models for Oxygen-Binding Hemoproteins," *Acc. Chem. Res.*, 10, 265 (1977).

Each of the known approaches in the art for the use of TECs, however, has been beset by one or more of the following problems: (1) insufficient oxygen capacity, (2) slow reaction rates, (3) decreasing reactivity with time, and (4) a metal ion:oxygen binding ratio of 2:1 ($\mu$-peroxo). Due to these problems, none of these TEC systems has yet been employed in commercially acceptable embodiments for air separation or oxygen removal from gas stream applications.

Extensive literature reports exist describing the reversible oxygenation of TECs having tetradentate ligands, particularly in solution. These materials require an exogenous base (e.g. a molecule or ion, added as a separate component, with a site or sites capable of coordinating to the metal center by electron donation) such as pyridine. The use of an exogenous base is necessary for TECs based on tetradentate ligands in order to provide the five-coordinate deoxy TEC sites required for superoxo binding.

One class of TECs is referred to as "protected" TECs. These use ligand superstructures referred to as "caps," "picket-fences," and "bridges" to sterically inhibit $\mu$-peroxo binding and to provide a permanent void on one face of the TEC that serves as an oxygen interaction site. Examples of such ligand systems include porphyrins, cyclidenes, and Schiff bases. Unfortunately, the number, complexity, and yields of the synthetic steps required to make TECs based on these superstructured ligands result in costs that are prohibitively high for many applications. In addition, the high molecular weights inherent in superstructured TECs restrict the oxygen loadings and storages that are achievable. Finally, oxygen interaction rates are slow for known, non-supported solid forms of protected TECs due to intracrystalline diffusion.

More recent reports disclose TECs having tetradentate ligands containing substituents capable of inhibiting $\mu$-peroxo dimer formation in solution, that can be prepared with relative ease and have relatively low molecular weights. The substituents in these systems are typically attached at a single-point. These materials require exogenous donors to provide five-coordinate deoxy TEC sites, and do not show sufficient oxygen uptake in the solid phase for commercial application. U.S. Pat. No. 5,266,283 to Friesen discloses metallo Schiff base complexes which act as regenerable oxygen adsorbents, having a tetradentate structure. These compounds expressly resist dimer formation. However, they lack structural versatility. U.S. Pat. No. 4,451,270 to Roman discloses an oxygen and nitrogen purification process employing a solvent, an "axial base" and an oxygen carrier. The carrier may be a tetradentate metallic compound. However, oxygen uptake in the solid state is not described nor expected.

Reversible oxygenation of TECs having pentadentate ligands in dilute solution is also known. Such disclosures include examples having substituents that inhibit $\mu$-peroxo dimer formation, and wherein the ligand structure and donors are intramolecular. Solid state TECs offer several advantages over those in dilute solution. TECs in solution have problems which have hampered commercial development such as solubility, solvent loss, viscosity, and TEC lifetime. To date, none of the known materials has been found to react reversibly with oxygen in the solid state.

U.S. Pat. No. 5,648,508 to Yaghi and many other publications disclose methods of preparing crystalline or microcrystalline microporous materials using metal and simple ligands that contain cyano, pyridyl, and carbooxylate functional groups. However, this prior art does not teach methods for preparing materials having a metal center that has at least one open coordination position for interaction with substrates. In addition, the simple functional groups taught in this patent, e.g., carboxylates, cannot produce a metal center (e.g., a cobalt center) with appropriate chemical potentials required for chemisorption (reversible oxygenation) and catalytic reactions.

The preparation of coordination polymers based on discrete molecular TECs incorporating sites capable of intermolecular donation has also been described. To date, however, none of these examples has been found to react reversibly with oxygen in the solid state.

The ability of transition element centers in some solid state TECs to undergo reversible interaction with oxygen is known, and the use of supports to disperse or distribute oxygen-selective sites derived from discrete molecular TECs to form oxygen selective adsorbents has been described. Unfortunately, the reported examples where TECs are dispersed on or within a support, within a polymer, or as an integral part of a polymer, contain insufficient oxygen-selective sites for practical use. As an example, Basolo et al. ("Reversible Adsorption of Oxygen on Silica gel Modified by Imidazole-Attached Iron Tetraphenylporphyrin", *J. Amer. Chem. Soc.*, 1975, 97, 5125–51) developed methods to attach iron porphyrins to silica gel supports via an axial donor. While these demonstrated a substantial improvement in stability relative to solution systems, the TEC content reported was less than 0.1 mol/kg.

Hendricks, in "Separation of Gases via Novel Transition Metal Complexes," Report Number NSF/ISI87101, Aug. 21, 1987 disclosed attempts to prepare oxygen-selective adsorbents based on TECs by intermolecular donation using peripheral ligand sites. However, it was concluded that the materials tested did not "rapidly and efficiently adsorb oxygen" and that this apparently was due to unfavorable molecular packing.

Another series of materials having oxygen selectivity at equilibrium includes cyanocobaltate materials such as lithium pentacyanocobaltate solvates. U.S. Pat. No. 5,126,466 to Ramprasad et al. discloses solid state cyanocobaltate oxygen-selective adsorbents. The primary ligand, however, is cyanide, which not only poses health issues but also results in a structurally non-versatile product. Further, while gas separation processes which utilize these materials have been disclosed, ranges of composition are restricted, and an ability to optimize performance by adjusting isotherm shapes is limited.

U.S. Pat. No. 6,183,709, assigned to the owner of the present invention, the disclosure of which is incorporated herein, discloses oxygen-selective adsorbent compositions which utilize intermolecular coordination to generate porosity. That invention involves TECs having up to four intramolecular donor ligands coordinated with a transition element ion, wherein the ligands provide a fifth donor site to intermolecularly bond to a second transition element ion contained in a second discrete TEC. These compositions exhibit high oxygen loadings and oxygen half saturation pressures which are suitable for gas separation. In the examples described therein, the structures contain five donors: four donors for intermolecular coordination to the primary metallic center, and one donor for intermolecular coordination with the metal of a second discrete TEC structure. The resultant porosity from this intermolecular coordination offers improved oxygen adsorption characteristics as compared with cyanocobaltate materials of the prior art.

It is among the objects of the present invention to provide a further TEC-based oxygen-selective adsorbent which reversibly binds oxygen, is easily synthesized and has superior porosity.

SUMMARY OF THE INVENTION

The present invention comprises a process and composition for selectively adsorbing a component of a gas mixture. The process comprises contacting the gas mixture with a solid state selective adsorbent material comprising a porous framework comprising one or more transition element complexes (TECs) which may be the same or different, and which have the formula shown in FIG. 1, wherein:

(a) M is a primary transition metal ion;

(b) D to $D_4$ are primary donors and m is zero or one, at least three of D to $D_4$ occupying primary donor coordination sites on M but leaving at least one open coordination site on M for an oxygen molecule to react with M;

(c) G to $G_4$ are functional groups and n is zero or one, at least one of G to $G_4$ being intramolecularly bonded to at least three adjacent primary donors to form at least one 5 or 6 member chelate ring bonded to the primary transition metal ion and providing at least three donors thereto;

(d) M, D to $D_4$ and G to $G_4$ together define one or more transition metal complexes, wherein said complexes are the same or different and wherein k is 0 to 4;

(e) R is an intermolecular connecting group selected from
  (i) secondary metal ions coordinated with secondary donors bonded to one or more of groups G to $G_4$ on the respective TECs;
  (ii) multifunctional organic groups forming covalent bonds with one or more of groups G to $G_4$ on the respective TECs;
  (iii) functional groups forming hydrogen bonds with one or more of groups G to $G_4$ on the respective TECs; or
  (iv) non-coordinating counter-ions spaced between and separating the respective TECs, the R group bonding and/or separating the respective TECs to and from one another to maintain them in a porous framework and wherein z is 1 to 8, and wherein R may be the same or different when z is greater than 1; and (f) y is an integer sufficient to provide said porous framework of the plurality of TECs for the selective adsorption of the desired component thereon.

As indicated hereinabove, the TECs incorporated in the adsorbent materials of the invention incorporate a transition metal ion (M) and one or more ligands (comprising the donors D to $D_4$ and groups G to $G_4$ covalently bonded thereto), providing at least one open coordination site on the transition metal for interaction of the active center provided thereby with guest molecules, e.g., oxygen, to be adsorbed thereon. The transition metal center is the first characterizing feature of the adsorbent materials utilized in accordance with the invention.

Illustrated specifically in FIG. 1 are complexes which comprise three TEC units. However, as shown therein, since κ is zero to four there may be from two to six TEC units in the complexes hereof.

In accordance with the second characterizing feature of the invention, the transition metal ion in each TEC unit is coordinated with at least three primary donors (D to $D_4$) which occupy coordination sites on each transition metal center M. The functional groups G to $G_4$ form ligands with the donors, at least one of G to $G_4$ forming a 5 or 6 membered chelate ring on the center. The primary coordination between the donors and transition metal center is controlled by the properties of the metal ion (its coordination geometry and stepwise equilibrium constants) and the structures and properties of the ligands. Selection of these materials controls the chemical properties, e.g., redox potentials and equilibria, and the configuration of the open coordination site, providing the improved adsorption characteristics of the materials of the invention.

The third characterizing feature of the transition metal complexes of the invention involves the assembly of the respective TECs into a porous framework by the bonding or separating moiety (R), which either bonds multiple TECs through coordinate bonding with the secondary metal ions (M') [see FIG. 3]; covalently bonds the respective TECs to peripheral ligand sites; orients the TEC species by hydrogen bonding; or separates the TECs by non-coordinating ions, to create a stable, porous coordination framework. Depending on the number and orientation of the respective TECs, two dimensional frameworks or three-dimensional frameworks having pore sizes equal to or greater than 3 Angstroms, may thus be provided. Provision of the stable, porous framework in accordance with the invention assures access of oxygen or other adsorbates to the open coordination sites in the multiple TECs constituting the absorbent material.

The provision of the porous TEC framework of the materials of the invention facilitates the formation of improved adsorbents, e.g., oxygen-selective adsorbents having high oxygen capacity, fast rates and structural versatility. Such materials have high contents of gaseous component binding sites and may employ ligands which may be readily modified to optimize performance characteristics such as reaction equilibria and rates. Moreover, the provision of the materials of the invention facilitates the use of relatively simple and inexpensive TEC structures such as Co(salen), Co(malen) and their derivatives, in advantageous chemisorption and/or catalytic processes.

A preferred embodiment of the invention is that shown in FIGS. 2 and 3 discussed below, wherein transition metals defining pentacoordinate sites, e.g., Co(II), Fe(II) or Mn(II), and leaving one open coordination position for interaction with an oxygen or other adsorbate molecule, are provided. Such TECs are desirably assembled in a porous framework by secondary coordination by means of secondary donors D' and secondary metal ions M', as schematically illustrated in FIG. 3 and more fully discussed below. It is preferred to utilize TECs incorporating such hexacoordinate primary metal centers, and secondary coordinate bonding between TECs in the adsorbent materials of the invention because this ensures that active metal centers are created that are accessible to potential adsorbates due to inherent porosity.

BRIEF DESCRIPTION OF THE DRAWINGS

Other objects, features and advantages of the present invention will occur to those skilled in the art from the following description of preferred embodiments thereof and the accompanying drawings, in which.

DETAILED DESCRIPTION OF THE INVENTION

Figure 1:
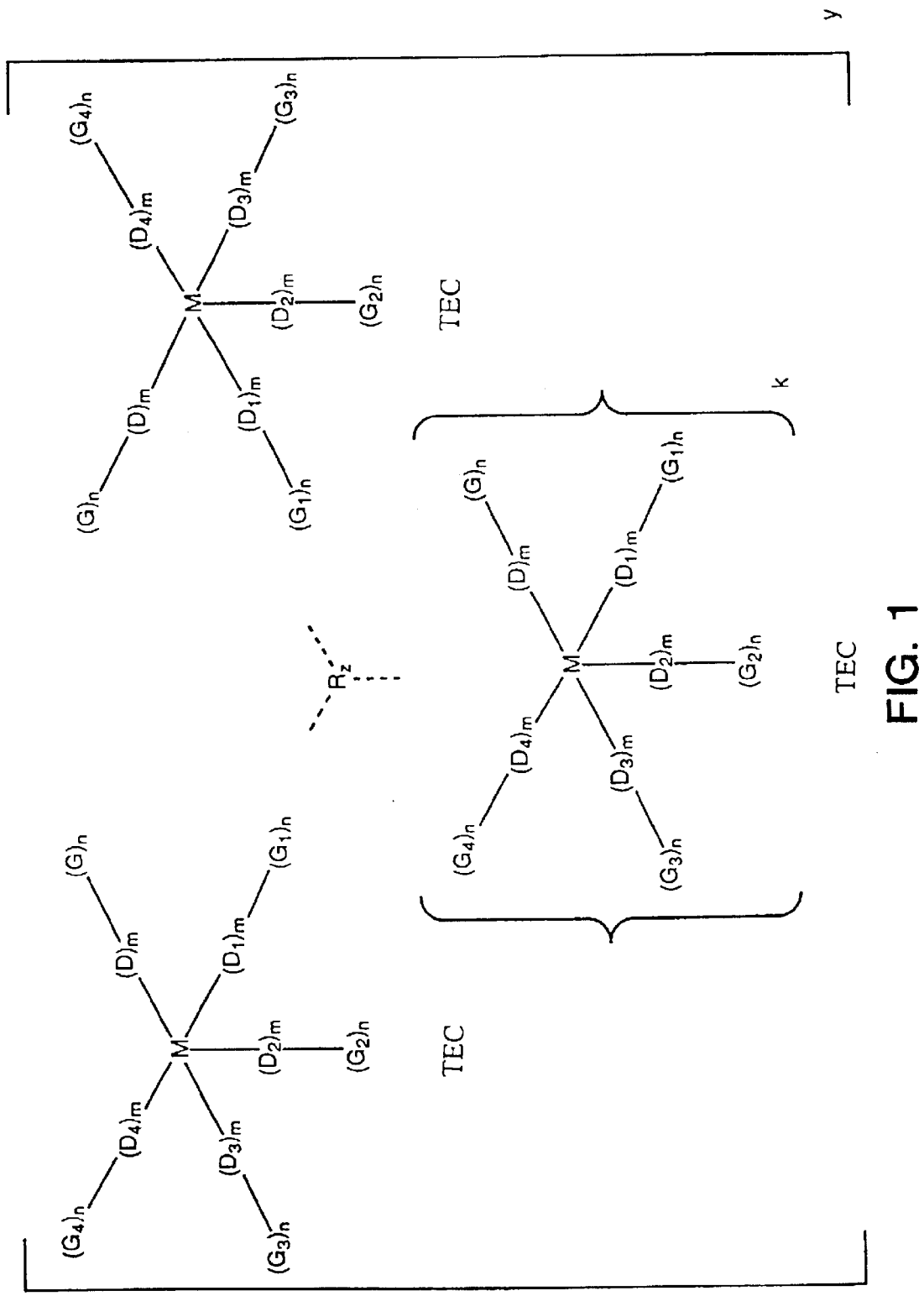
FIG. 1 represents the schematic structure of the TEC complexes of the present invention.

The transition element complexes of the present invention are represented schematically in FIG. 1. It is contemplated that group R intermolecularly bonds the discrete TEC units together in a spatial arrangement to form a TEC framework. Group R creates the framework of the various TECs by secondary coordination, covalent bonding, hydrogen bonding, or electrostatic interaction through the use of non-coordinating counter-ions. As visualized in FIG. 1, the intermolecular connection of the separate TEC units A, B, and C creates pores therebetween. These pores allow gas molecules, such as oxygen or carbon monoxide access to the transition metal ion M to which they are adsorbed. The TEC to R ratio may range from 6:1 to 1:8.

It will be understood that the R group may be coordinated with, bonded to or separate the various TECs at any points in the ligands formed by donors D to D$_4$ and functional groups G to G$_4$, not necessarily at the positions diagrammatically illustrated in FIG. 1. Further, the intermolecular connection may be between any two or all three of the TECs to provide either two-dimensional or three-dimensional frameworks along the respective orthogonal axes.

Figure 2:
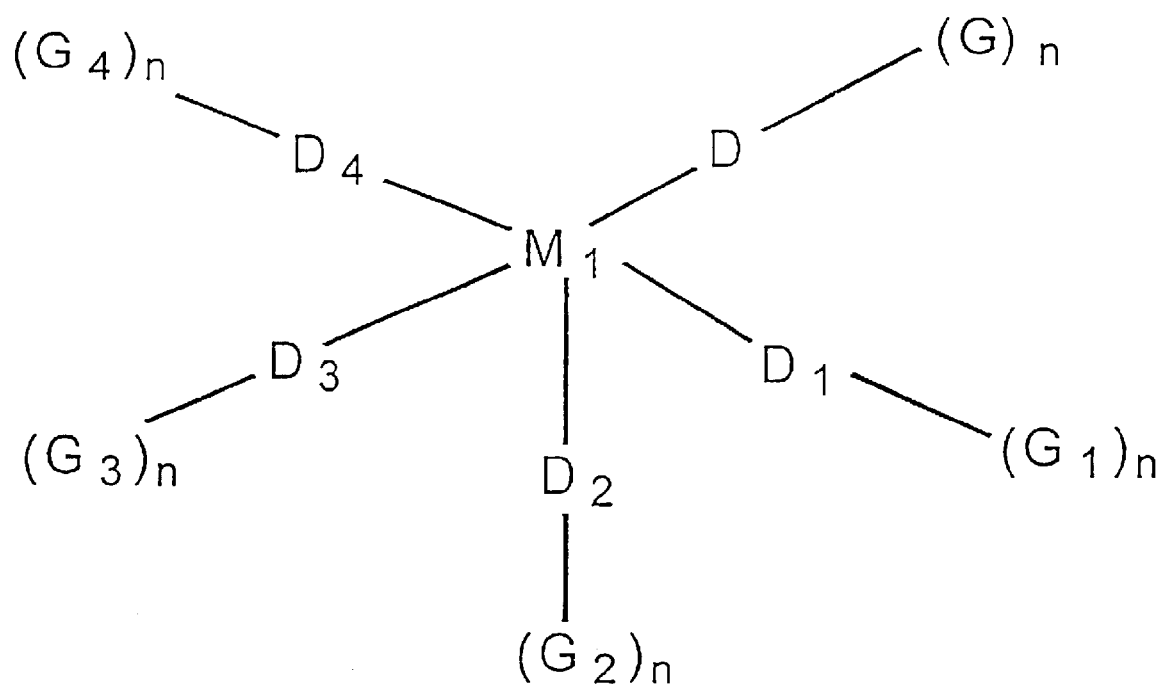
FIG. 2 is a schematic structure of a preferred embodiment of the TECs incorporated in the TEC complexes hereof.

The structure of the preferred TEC unit incorporating pentacoordinated transition metals M having five primary donors D to D$_4$ thereon (and one coordination site for bonding the desired sorbate) is schematically represented in FIG. 2. Donors D to D$_4$ bond to transition metal M to form the primary coordination infrastructure. Functional groups G to G$_4$, in turn, bond to these donors. It is these functional groups which form the chelate rings which, in turn, interact with group R to form the intermolecular structure.

Figure 3:
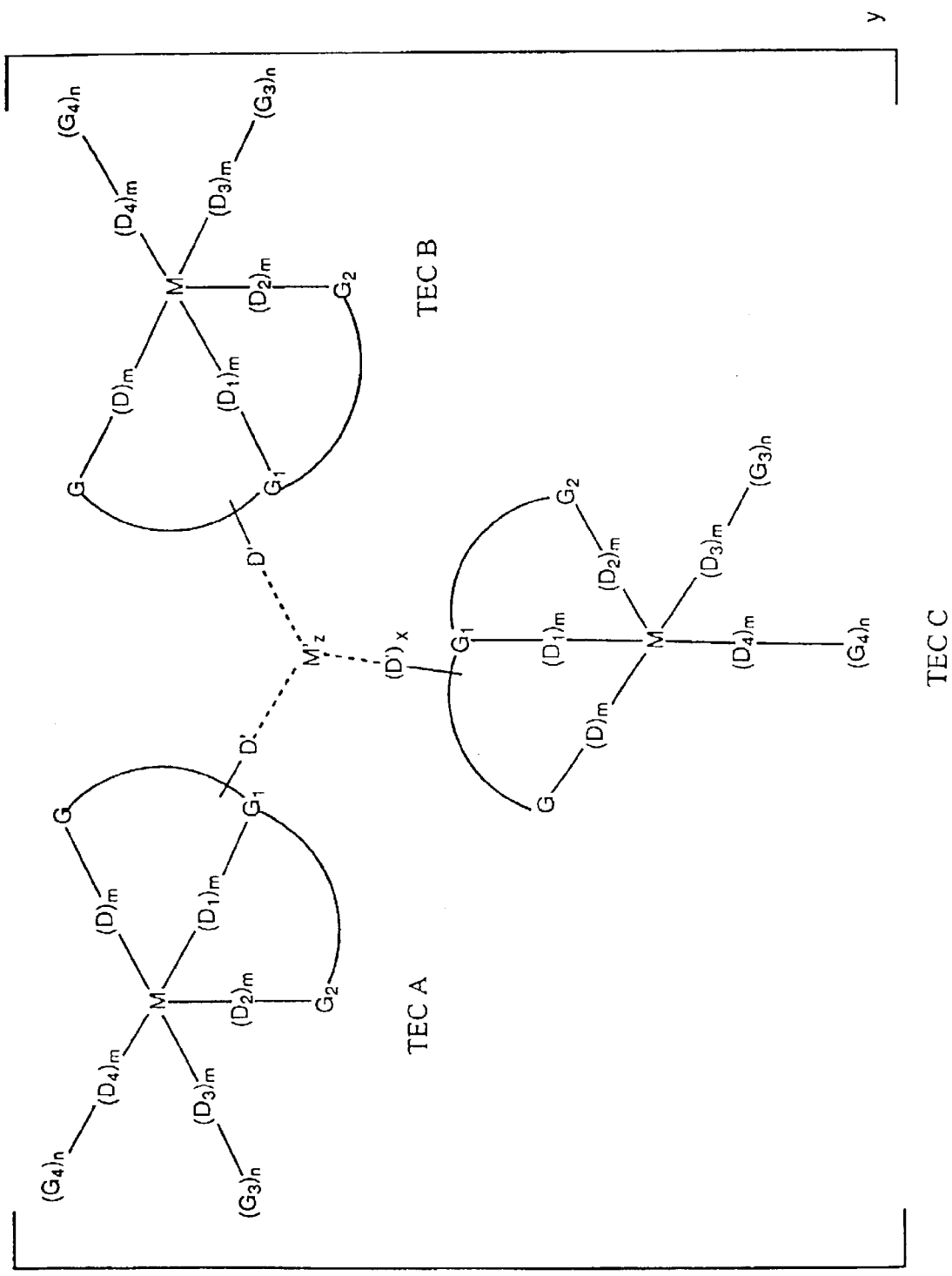
FIG. 3 is a schematic structure of a preferred embodiment of the TEC complexes of the invention, embodying TECs of FIG. 2 incorporating hexacoordinate transition metal ions having an open coordinate position and assembled into a porous framework by secondary coordination.

The preferred embodiment of the transition metal complex framework of the present invention is schematically represented in FIG. 3. In the figure, the discrete TEC units are intermolecularly bound to each other through secondary coordination. It is understood that some or all of the TECs may be the same or different. Group R, as discussed above, facilitates the secondary coordination through secondary donors D' attached to a central, secondary coordinating metal M'. These secondary donors interact with the chelate rings of the TEC units, the chelate rings being formed through the intramolecular bonding of the primary donors D to D$_4$ and the functional groups G to G$_4$.

A. Composition of the Adsorbent Materials

As indicated hereinabove, the materials of the invention have three essential features:

(1) an active, transition metal ion center which has at least one open coordination site accessible to guest molecules such as oxygen;

(2) one or more ligands incorporating primary donors (D to D$_4$) having functional peripheral groups (G to G$_4$) bonded thereto, at least one of the ligands providing at least three primary donors to the primary transition metal center (M); and (3) a moiety (R) bonding and/or separating the TECs, defined by the respective transition metal ions and donor-bearing ligands, from one another. The compositions of these respective elements are described below:

(1) The Primary Transition Metal Ions (M)

The primary transition metal sites are the active centers of the transition metal complex materials of the invention. When the transition metal binds to appropriate primary donors, the primary metal has the required properties to perform chemisorption or catalytic reactions. For the more general applications including adsorption and catalysis, suitable metal centers include all the first, second and third row transition metals of the Periodic Table, and the lanthanides, including but not limited to Sc(III), Ti(III), Ti(IV), Ti (VI), V(II), V(III), Cr(II), Cr(III), Mn(II), Mn(III), Fe(II), Fe(III), Co(I), Co(II), Co(III), Ni(I), Ni(II), Cu(I), Cu(II), Zn(II), Y(III), Zr(IV), Nb(IV) Nb(V), Mo(III), Tc(V), Ru(III), Pd(II), Ag(I), Cd(II), Pt(II), Hg(I), Hg(II). Examples of transition metals useful herein include those intended for catalytic and adsorption applications where more than one primary transition metal ion is involved, for example as a pathway to changing isotherm shapes, promoting different catalytic processes, or for catalysis where multiple substrates are present. For example, compositions containing both Co(II) and Cu(I) active sites may be so utilized in the materials of the invention. For reversible oxygenation in response to changes in pressure or temperature, the preferred transition metal sites include Fe(II), Co(II), Cu(I), Mn(II), Ru(II), Ru(III), and Rh(II). For reversible binding of carbon monoxide, typical metal centers include Cu(I).

As indicated above, the pentacoordinate transition metal ions, e.g., Co(II), Fe(II) and Mn(II), are utilized as the primary active centers of the TECs incorporated in the materials of the invention when employed as solid adsorbents of oxygen from gaseous mixtures. These transition metals have particularly appropriate chemical properties, e.g., redox potential for chemisorption and/or chemical reactions. The use of cobalt (II) as the primary transition metal center for such purposes is particularly preferred.

(2) The Primary Donors (D to $D_4$) and Ligand-forming Groups (G to $G_4$)

As illustrated in FIG. 2, the primary donors D to $D_4$ coordinate with the transition metal center M and are bonded to groups G to $G_4$ to provide organic ligands coordinated with the transition metal center of each TEC. At least one of the ligands, incorporating at least three of the donors D to $D_4$ is coordinated to the same transition metal center M to form a five or six-membered chelate ring. At least three of the D or G groups may be connected to form a tridentate ligand or, as shown in FIG. 3, two G groups may be connected to form bidentate ligands. The multidentate ligands control the chemical properties and the coordination position for the association of oxygen on the primary metal center, and thus insure an accessible active site thereon.

The primary donor atoms D to $D_4$ may be N, O, S, C, P, Cl, F and Br and may be neutral (e.g., the N atom in pyridine) or charged (i.e., the O in $RO^-$). The donors may be incorporated in the functional groups G to $G_4$ providing the ligands associated with the TECs. Functional groups which may be so utilized include heterocyclic groups such as pyridinyl or imidazolyl, amino groups such as —$R^1R^2R^3N$—, imino groups such as —$R^1N$=$CR^2R^3$ or —N=$CR^1R^2$, carbonyl-containing groups such as —$R^1C(O)R^2$, —$R^1CONR^2R^3$, and —$R^1CO_2R^2$, cyano groups such as —$R^1$—CN, nitro groups such as —$R^1$—$NO_2$, phenolates with as many as five substituents including halogens and $R^1$, carboxylates such as $R^1CO_2$—, and alkoxy groups such as $R^1O$—, wherein $R^1$, $R^2$ and $R^3$ can be the same or different and are substituted or unsubstituted acyclic or carbocyclic groups, or substituted by F, Cl, Br, O, N, P, S, Si, or B.

One or more of the ligands constituted of the primary donors D to $D_4$ and functional peripheral groups G to $G_4$ may provide a substituent or substituents which inhibit $\mu$-peroxo dimer formation and insure vacant oxygen interaction sites on the TEC. Some or all of the ligands should also incorporate or be associated with the intermolecular connecting group R for bonding and/or separating the respective TECs to establish the porous framework thereof, and provide pathways and access to the primary metal centers which serve as active sites.

(3) The Intermolecular Connecting Groups (R)

In accordance with the third feature of the invention, secondary interaction through group R is used to connect the TECs and create pores around them. In solution, guest molecules can easily access metal centers in TECs since the molecules are mobile. However, this is not the case in the solid state, and accessibility of the metal centers is a key to performance. Molecules in the solid phase tend to pack closely to increase the van der Waals interaction between molecules. As a result, most TEC solids are dense and guest molecules cannot enter the solid to interact with the metal center.

The present invention utilizes secondary interactions between TEC species to create porous materials. These secondary interactions create space around the TEC molecules to provide pathways for guest molecules to enter the solid phase and enable them to interact with metal centers. In accordance herewith, the TECs can be bridged by coordinate bonds with secondary metal ions, covalent bonds with organic fragments, hydrogen bonds or combinations thereof. Alternatively, space around the TECs can be created by non-coordinating ions or organic molecules.

(i) Secondary Coordination Through Secondary Metals (M') and Secondary Donors D'

As shown in FIG. 3, in one, preferred form of the invention secondary metal ions M' are used to coordinate with secondary donors D' on the peripheral functional groups G to $G_4$ associated with the primary donors D to $D_4$ on the respective TECs. The role of the secondary metal ions is to provide pores around the active centers M. Therefore, the choice of the secondary metal is based on the coordination properties of the metal, including its coordination number and the coordination geometry. Secondary metals can be any metal ion from the Periodic Table (e.g., transition metal ions). Particular examples are provided by the alkal metals, the alkaline earth metals, the elements in the first, second and third transition series in the Periodic Table, and the lanthanides. Specific examples include $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $B^{3+}$, $Al^{3+}$, $Al^{3+}$, $Ga^{3+}$, $In^{3+}$, $Tl^{3+}$, $Sn^{2+}$, $Sn^{4+}$, $Pb^{2+}$, $Sb^{4+}$, $Sc^{3+}$, $Ti^{3+}$, $V^{3+}$, $Cr^{3+}$, $Mn^{2+}$, $Fe^{2+}$, $Co^{2+}$, $Ni^{2+}$, $Cu^{2+}$, $Zn^{2+}$, $Y^{3+}$, $Zr^{n+}$, $Nb^{n+}$, $Mo^{n+}$, $Tc^{n+}$, $Ru^{3+}$, $Rh^{n+}$, $Pd^{2+}$, $Ag^+$, $Cd^{2+}$, lanthanides ($Ln^{n+}$), $Pt^{2+}$, $Au^{3+}$ and $Hg^{2+}$. Selection of a particular secondary metal M' is based on size, coordination state preference, and cost. Size of the secondary metal cation is an important parameter to adjust performance of oxygen-selective sorbents by providing control of system porosity.

The secondary donors D' are used with the secondary metals to create porosity. D' may represent a single donor or a group of donors and may bond to more than one R group (see Example 1C and FIG. 5). Further, D' is bonded to a chelate ring or a ligand forming group G to $G_4$. In order to use secondary metal ions to construct the framework, the ligands associated with the TEC should provide additional donors for the secondary metal ions. Therefore, the ligands in the TEC molecule should contain at least one secondary donor atom but no more than 10, preferably 3 to 6, which are most suitable for the construction of three-dimensional frameworks. The coordination atoms include O, N, S, Cl, F, Br, I, C, and P. Those donors can come from functional groups including —O, —OH, —OR', —C(O)R', —CO$_2$, —CO$_2$R', —OC(O)R', —CO$_2$NR'$_2$, —NR', —NR'$_2$, —CN, —NO, —NO$_2$, SO$_3$, —S, —SR', or —PR'$_2$ (R'=H, or an alkyl or aryl group).

The coordination environments at the secondary metals can be different from that at the active site since the role of the secondary coordination interaction is to generate porosity, whereas the role of the primary coordination is to control the properties of the active center. There is thus provided a rational approach for preparing multi-dimensional coordination frameworks which contain both active centers for chemisorption and catalytic reactions and pathways for guest molecules to access the active sites in the solid phase.

Use of secondary coordination between peripheral sites on primary donors and the secondary metal ions to create cavities around the active sites and channels in the solids is particularly attractive for the preparation of the oxygen-selective adsorbents. For oxygen adsorbents, the active site should have an appropriate redox potential for reversible oxygenation. If the redox potential is too high, the interaction between metal and oxygen molecule is too weak and the oxygen loading will be very low under conditions required for low cost processes. However, if the redox potential of the active site is too low, the metal can be readily irreversibly oxidized by oxygen.

The properties of a metal ion M which provides the active site depend on the donor set, electronic structures of ligands, and coordination geometry around the metal ion. Collectively, these factors play important roles in determining the reversibility of oxygenation. Ligands such as Schiff bases, porphyrins and associated dianions, and cyclidenes, and a few metal ions such as Co(II), Fe(II), and Mn(II) produce compounds which have well-defined reversible oxygenation ability. Co(salen), Co(malen) (See FIG. 4) and related structures are the most common simple oxygen carriers that combine structural simplicity and low molecular weight. These systems show reversible oxygenation in solution, but as solids they exhibit either very slow oxygenation, very low oxygen loadings, or no loading at all due to efficient molecular packing in solids.

The methods and compositions of this invention facilitate the formation of accessible active sites in solids. Many derivatives of Co(malen) and Co(salen) have secondary donors which can be used for the secondary coordination interaction and can be prepared at low cost. Combination of the desired chemical property, the flexibility in modification of the structure and performance, and the low costs make the approaches described herein very attractive for preparation of oxygen-selective adsorbents.

Co(Me$_2$Ac$_2$H$_2$malen) illustrates this approach. The cobalt in the complex is four-coordinate and the four donors are in a square planar arrangement around the metal center. The cobalt(II) ion has a tendency to coordinate to another ligand at the axial position to form a five-coordinate species, which is capable of reversibly binding an oxygen molecule in the superoxo binding mode (Co:O$_2$=1:1). When the lithium salt of 4-hydroxypyridine is used as an axial ligand, the lithum ion serves as the secondary metal ion. The lithium ions coordinate to the secondary donors which are the oxygen atoms from the deprotonated hydroxyl group on the axial ligand and two carbonyl groups from two adjacent TEC molecules. The coordination of the lithium ion with Co(Me$_2$Ac$_2$H$_2$malen)(4-Py—O$^-$) molecules creates a porous framework.

(ii) Covalent Attachment

Alternatively, the TECs may be covalently bonded to create porosity in the solid material. R may be a bicarbonyl radical

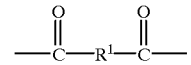

a tricarbonyl radical

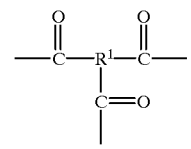

or a tetracarbonyl radical

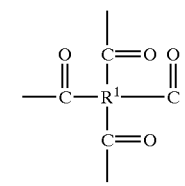

and may be substituted by F, Cl, Br, O, N, P, S, Si or B. Organic fragments can be used to cross-link TECs through chemical reactions at the ligand periphery to form the covalent bonds R to provide porous TEC systems. For TECs where the ligand periphery contains sites that are reactive and where the products still serve as active sites for adsorption or catalysis following chemical modification, the use of polyfunctional reagents can lead to porous structures. Combinations of reactive bifunctional organic systems with TECs containing two reactive sites result in a linear polymeric system. However, when either the organic reagent or the TEC has more than two reactive sites, then crosslinking occurs. Similarly, mixtures of organic reagents containing two and three reactive sites, respectively, provides products with linear and crosslinked sections. Stoichiometry control can be used in these cases to control porosity. In all cases, additional donors may be provided to provide active metal centers. For example, crosslinked TECs based on cobalt (II) with tetradentate ligands require provision of one monodentate ligand per site to provide active five coordinate sites.

Consider, for example, embodiments in which both the TEC and the organic compound contain only two reactive sites each. This will necessarily result in a linear polymeric species. The introduction of a TEC or organic species with more than two sites enables formation of a crosslinked system even if the new species is a minor component. Therefore, examples where the average number of reactive sites on TECs and organic compounds is greater than two will be crosslinked. Both mixtures of species and single components meet this criterion. Indeed, the combination of species containing different numbers of sites enables control of linear and crosslinked regions of the solid and allows control of system porosity.

Since the polymeric products tend to be amorphous, both rigid TECs and relatively rigid organic agents are preferred to create permanent porosity. In addition, the molecular weight of the organic modifier should be minimized to provide high contents of reactive centers per unit mass and per unit volume, preferably over 1.5 mmol/g.

The covalent modification approach to provide porous TEC frameworks is known in solution for TEC modification at peripheral ligand sites with monofunctional reagents, or with bifunctional reagents used in a way to maximize intramolecular reactions to provide bridges such as in the case of lacunar cyclidenes, bridged porphyrins or Schiff base complexes. In the present case, the goal is deliberate formation of polymeric species that function as adsorbents or catalysts in the solid-state including crosslinked systems. An example of a crosslinked TEC system is the product from the reaction of 1,3,5-benzenetricarbonyltrichloride with $Co(Me_2H_2H_2$ malen) in the presence of triethylamine.

(iii) Hydrogen Bonding

Hydrogen bonding can also be used to organize the TEC species and create porosity. Functional groups which are capable of forming hydrogen bonds can be attached to ligands on the TECs. The interactions between those functional groups create channels around the TEC species and cavities around the active metal centers. Groups capable of hydrogen bonding include amido groups $R^1CONR^2$—, an amino group $R^1R^2N$—, a carbinol group —$R^1OH$, and a carboxylic acid group $R^1CO_2H$, wherein $R^1$ and $R^2$ are the same or different and are unsubstituted acyclic or carbocyclic groups or substituted acyclic or carbocyclic groups substituted by F, Cl, Br, O, N, P, S, Si or B.

(iv) Non-coordinating Ions

Non-coordinating ions R may be used to separate TEC species in the solid to create porosity. If the TECs used to provide active sites are ionic, then counter-ions are needed for charge balance. These counter-ions are distributed between TEC molecules throughout the crystals. When the counter-ions have a relatively large size, they can separate TEC molecules and prevent them from packing efficiently to form dense materials. Therefore, counter-ions R can be used to generate porosity to provide vacant and accessible sites for guest molecules. The ions that can be used with anionic TECs include alkylammonium or arylammonium cations having the formula —$(R^1R^2R^3R^4)N^+$, wherein $R^1$, $R^2$, $R^3$ and $R^4$ are the same or different and are hydrogen and at least one of which is an unsubstituted acyclic or carbocyclic group or an acyclic or carbocyclic group substituted by F, Cl, Br, O, N, P, S, Si or B. The ions that can be used with cationic TECs include both inorganic and organic anions such as $BX^-_4$ (X=F, OR"), $PF^-_6$, $NO^-_3$, $SO_4^{2-}$, $CO_3^{2-}$, $MoO_4^{2-}$, polyoxometallates, R"$CO_2$—, R"$O^-$, R"$SO^-_3$ (R"= alkyl with 1 to 20 C atoms, and aryl or heterocyclic groups with 4 to 20 carbon or hetero atoms).

B. Preparation of the Adsorbent Materials

The adsorbent materials of the invention can be prepared conveniently in a step-by-step fashion. The first step is to prepare the individual TECs (the primary coordination spheres) using methods well known to those skilled in the art. The next step is to use these materials to prepare the intermolecular connecting group R (the secondary coordination sphere, where a secondary metal ion M' is employed, as in the embodiment of FIG. 3). Typically, a solution or slurry of the system that provides the primary coordination sphere is treated with a reagent or reagents to create the secondary coordination sphere with heating if necessary. Solid formation occurs either spontaneously or in response to cooling, concentration, or change in solvent composition (e.g. precipitation). Isolated solid can be treated with a solution or vapor containing additional potential donors, if required to provide active sites.

Although the materials can be prepared in two steps, the preparation can also be performed using a one-pot reaction if 1) one metal will be used for both the primary (M) and secondary (M') coordination spheres or 2) the metals and the donors on the ligands have such distinguishable coordination properties that each metal will form its own coordination environment to create the desired structure without interference. For example, the complex in Example 2B below, $Co(Me_2Ac_2H_2$ maltmen)(4-PyOLi)(EtOH), can be prepared through a one-pot reaction using a cobalt salt, $H_2(Me_2Ac_2H_2$ maltmen), lithium hydroxide, and 4-hydroxypyridine in ethanol since cobalt and lithium have very different coordination properties and will not compete with each other for the coordination sites.

When organic reagents are used to cross-link TEC molecules to form a porous solid, it is necessary for the ligands on a TEC to have at least two reactive sites. The cross-linking reagents react with the reactive sites to form three-dimensional frameworks.

It may be desirable to use the TEC in the metal form that is required to provide active sites when chemical reaction occurs. In addition, in many cases, the sites that are reactive in the TEC are undesirable in an unreacted state. For this reason, it may be desirable to perform a capping reaction to consume residual unreacted sites through use of monofunctional organic reagents. In addition, it may be desirable to provide a quenching step to consume residual reactive organic species to prevent formation of undesirable products including acids. End capping is conveniently performed with acetyl chloride, and quenching occurs with the addition of excess methanol. The capping procedures and quenching requirements are well known to those skilled in the art for non-polymeric systems.

When it is desired to utilize covalent bonding to connect the various TECs and the crosslinking reaction between TECs and reactive organic reagents occurs and solids starts to form, the reactions that result in covalent bonding can be inhibited or prevented. For this reason, use of excess organic reagents is preferred so that a high proportion of reactive sites on the TEC periphery are consumed, particularly in cases where the unreacted TEC sites are undesirable. In addition, in most cases it is desirable to quench residual unreacted organic groups to convert them to inert forms. Further, the use of small monofunctional organic reagents is desirable after crosslinking if the reactive sites on the TEC periphery are deleterious to the properties on the TEC sites, e.g., degrade performance.

The crosslinking reactions can be performed either with the active metal center present, with a metal center that can be replaced with an active center, or using a chelating ligand suitable for forming a reactive center. The direct use of TECs containing the reactive center for the adsorption or catalytic application is preferred.

In many cases for crosslinked TECs as oxygen-selective adsorbents, it is desirable to work with parent TECs in which the ligand provides 4 donors to the central metal ion. In these cases, the introduction of additional monodentate donors is necessary to convert the crosslinked solid to an active pentacoordinate state. This can be accomplished using vapor infiltration or by treating the crosslinked solid with solutions containing potential donors. Control of the amount of additional monodentate donors is desirable to create the optimal concentration of five coordinate sites without blocking pore structure and inhibiting transport. Potential axial donors that do not exhibit appreciable volatility are preferred, including pyridine, imidazole, and their derivatives.

C. Applications of the Adsorbent Materials

As indicated hereinabove, the materials prepared in accordance with this invention are primarily intended for use as oxygen-selective adsorbents. Such use would involve passing an oxygen containing gas, such as air, over a bed of such adsorbents and recovering either oxygen or the non-adsorbed components (e.g. nitrogen) as product.

However, the methods described herein for formation of coordinatively unsaturated metal centers in porous systems are also capable of providing materials suitable for use in other applications, e.g., as adsorbents for carbon monoxide, and catalysts for organic transformations, e.g., oxidations.

EXAMPLES

Figure 4:
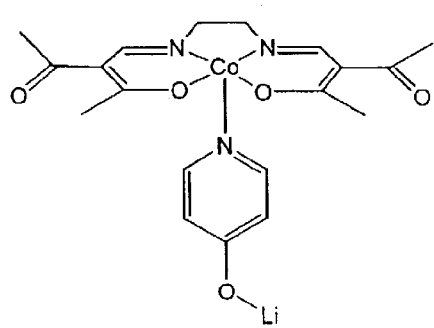
FIG. 4 is a schematic drawing of the structures of Co{(Me$_2$Ac$_2$H$_2$malen}(4-PyOLi); Co{Me$_2$Ac$_2$H$_2$maltmen}(4-PyOLi); Co(Me$_2$Ac$_2$H$_2$maldmen)(4-PyOLi); and Co{Me$_2$H$_2$H$_2$malophen}, four TECs useful in the practice of the present invention.
Figure 4:
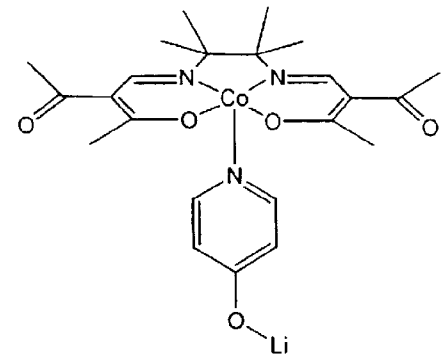
Figure 4:
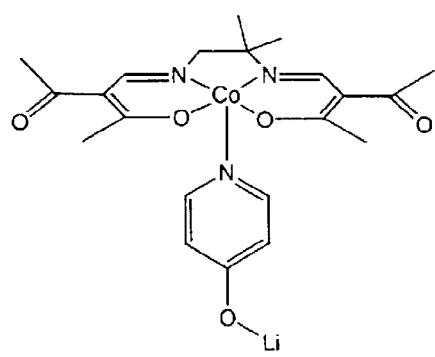
Figure 4:
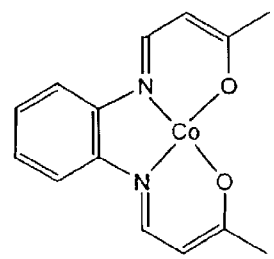

The following examples disclose the methods of preparation and properties of six preferred embodiments of the porous oxygen-selective adsorbents of the invention. All of the examples utilize cobalt as the active metal center M and all multidentate ligands are derivatives of malen (FIG. 4). The six materials can be classified in two types. The porosity of Type 1 is created by secondary coordination while the porosity in Type 2 is produced by covalent bonds. The materials exemplified are:

Type 1: $Co\{Me_2Ac_2H_2malen\}(4\text{-PyOLi})$, $Co(Me_2Ac_2H_2maltmen)(4\text{-PyOLi})$; and $Co\{Me_2Ac_2H_2maldmen\}(4\text{-PyOLi})$;

Type 2: $Co(Me_2H_2H_2malophen)/tricarbonyl/py$, $Co(Me_2H_2H_2malophen)/tricarbonyl/terephthaloyl/py$, and $Co(Me_2H_2H_2malophen)/tricarbonyl/oxalyl/py$.

Note that those skilled in the art will know that:

Py=pyridine

4-PyOLi=lithium salt of 4-hydroxypyridine malen=dianion of the condensation product between two equivalents of a malonaldhyde derivative and one equivalent of ethylenediamine.

maldmen=same as "malen" except with additional two methyl groups at one of the carbon atoms on the ethylenediamine maltmen=same as "malen" but with additional four methyl groups at the carbon atoms on the ethylenediamine malophen=dianion of the condensation product between two equivalents of a malonaldhyde derivative and one equivalent of 1,2-phenylenediamine The substituents on malonaldhyde are placed in front of "malen", "maltmen", or "maldmen". The order of substituents is those at the carbonyl carbon, those at $CH_2$ group, and those at the carbonyl carbon that reacts with amine to form imine. See FIG. 4 for the structures of the four ligands used.

Type 1

(1) $Co\{Me_2Ac_2H_2malen\}(4\text{-PyOLi})$:

Examples 1A and 1B describe the sequential steps in the preparation of the material containing a solvent molecule. Example 1C discloses the crystal structure of the material. Example 1D discloses the removal of the solvent molecule to obtain the active adsorbent. Example 1E discloses the oxygen and nitrogen isotherms of the adsorbent. Example 1F discloses the results of surface area and porosity measurements thereof.

(2) $Co\{Me_2Ac_2H_2maltmen\}(4\text{-PyOLi})$:

This material is obtained using the same approach as that for the material of Example 1. However, this material has very different properties than the malen derivative. It is used here as an example to show a significant modification from structural tuning, one of the performance advantages of the invention. Examples 2A–2C describe the sequential steps of preparation of this material. Its nitrogen and oxygen isotherms are given in Example 2D and its response in a TGA cycling experiment is disclosed in Example 2E. Example F describes the fine-tuning of the oxygen isotherm for $Co(Me_2Ac_2H_2maltmen)(4\text{-PyOLi})$.

(3) $Co(Me_2Ac_2H_2maldmen)(4\text{-PyOLi})$:

This material also has strong oxygen affinity, similar to the material described in Example 1. However, it has a much faster desorption rate than the material in Example 1. This material is prepared using a similar procedure described in Example 1. Example 3A, 3B, and 3C describe the preparation procedures while Example 3D disclose the adsorption isotherms for oxygen and nitrogen.

Type 2:

All the following materials are of Type 2, in which the porosity is created by covalent bonding. The differences between them are attributable to the reagent used to connect the TEC species.

(3) $Co(Me_2H_2H_2malophen)/tricarbonyl/py$:

In this material, the TEC species are connected by tricarbonyl groups. Examples 3A and 3B show the sequential preparation steps while Example 3C presents the nitrogen and oxygen loadings.

(4) $Co(Me_2H_2H_2malophen)/tricarbonyl/terephthaloyl/py$:

In this material, the TEC species are connected by tricarbonyl and terephthaloyl groups. Example 4A describes the preparation and Example 4B shows the oxygen and nitrogen loadings.

(5) $Co(Me_2H_2H_2malophen)/tricarbonyl/oxalyl/py$:

In this material, the TEC species are connected by tricarbonyl and oxalyl. Examples 5A and 5B disclose the preparation and the $O_2$ and $N_2$ loadings, respectively.

The reactions described in the examples involving cobalt (II) complexes were performed in an inert atmosphere glove box. Reagents and solvents were handled using methods to maintain an inert atmosphere. Samples for testing were removed from the glove box and were handled with minimal exposure to ambient air.

Example 1

$Co\{Me_2Ac_2H_2\,malen\}(4\text{-PyOLi})$

A. Preparation of $Co(Me_2Ac_2H_2malen)$

In a glove box under a nitrogen atmosphere, NaOH (16.0 g) was dissolved in 200 mL of methanol with heating and stirring. $CoCH_3(CO_2)_2\text{-}4H_2O$ (49.8 g) and the chelating ligand prepared by condensation of two equivalents of 3-ethoxymethylene-2,4-pentanedione with one equivalent of 1,2-diaminoethane were placed in a 1000-mL Erlenmeyer flask, 300 mL of methanol was added, then the mixture was heated. As soon as the cobalt salt dissolved (ligand remains suspended), the NaOH solution was added dropwise with continued heating and vigorous stirring. A brown precipitate formed during the addition of NaOH resulting in formation of a slurry. After complete addition of the NaOH, an orange micro-crystalline product was obtained. The resulting mixture was heated and stirred for another hour before it was cooled to room temperature. The mixture was stirred and the supernatant, which contained some insoluble impurity, was decanted after crystals settled to the bottom of the flask. Two portions of methanol (200 mL) were added to wash the product with stirring and decanting. Finally, the product was collected by filtration. Yield: 60 g or 89%.

B. Preparation of $Co(Me_2Ac_2H_2\,malen)(4\text{-PyOLi})$ (MeOH)

Method (i): In a glove box under an inert atmosphere, lithium tert-butoxide (8.0 g) and 4-hydroxypyridine (9.5 g) were dissolved in 80 mL of methanol. This solution was added slowly to a suspension of $Co(Me_2Ac_2H_2malen)(16.8$ g), prepared according to the method described in Example 1A, in 350 mL of methanol. With heating and stirring, the solid dissolved to form a dark brown solution. The solution was cooled to ambient temperature and the solvent was allowed to evaporate slowly in the glove box. A dark brown solid formed and was collected by filtration, washed with a small amount of methanol, and dried under vacuum. The weight of the product was 18.8 g.

Method (ii): In a glove box under an inert atmosphere, lithium hydroxide (2.4 g) and 4-hydroxypyridine (9.5 g) were dissolved in 200 mL of methanol with stirring and heating. To the boiling solution, 16.8 g of Co($Me_2Ac_2H_2$malen), prepared according to the method described in Example 1A, was added with stirring and heating. A dark brown solution was obtained and a solid started to form within minutes. The mixture was allowed to cool to ambient temperature overnight. The product was filtered, washed with methanol, and dried under vacuum.

C. Crystal Structure of Co($Me_2Ac_2H_2$malen)(4-PyOLi) (MeOH)

In a glove box under a nitrogen atmosphere, lithium tert-butoxide (2 mmol) and 4-hydroxypyridine (2.0 mmol) were dissolved in 5 mL of MeOH and the solution was added to a suspension of Co($Me_2Ac_2H_2$malen) (1 mmol) in 5 mL MeOH in a 4-Dram vial. The mixture was heated with stirring to obtain a dark brown solution. The vial was closed with a cap containing a small hole to allow very slow evaporation of the solvent. After one week, dark brown single crystals were obtained. X-ray quality single crystals were transferred to thin-wall glass capillary tubes. Before removing from the glove box, some mineral oil was used to seal the opening of the tubes. The crystals were sealed in the capillary tubes with a thin flame immediately following removal from the glove box.

Figure 5:
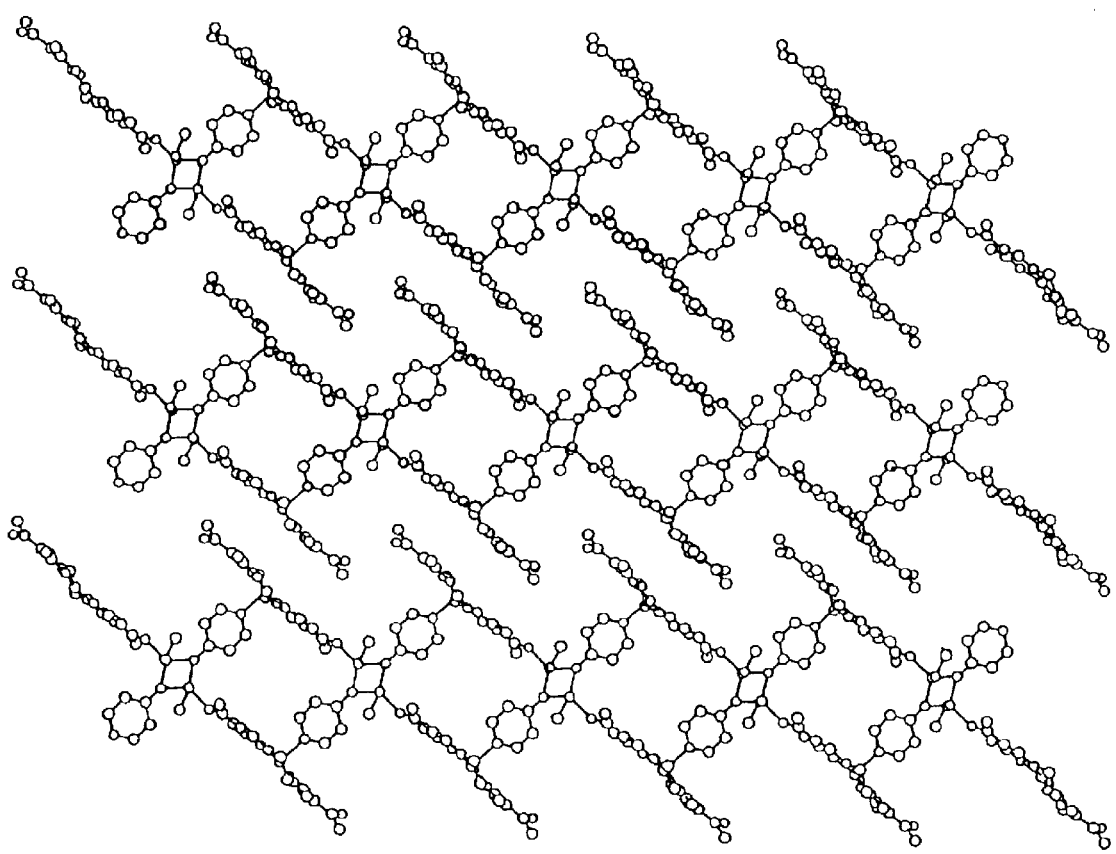
FIG. 5 is a schematic drawing of the three-dimensional crystalline structure of Co{Me$_2$Ac$_2$H$_2$malen}(4-PyOLi)(MeOH)

One of the crystals was loaded onto a single crystal X-ray diffractometer and diffraction data were collected. The crystal structure of Co($Me_2Ac_2H_2$malen)(4-PyOLi) (MeOH) is shown in FIG. 5. The structure indicates that the coordination of the secondary metal ion $Li^+$ with the oxygen atoms on the ligands connects the molecules to form polymeric chains, which further pack using acetyl groups to form layers. The layers interact with each other through hydrogen bonds between methanol molecules and carbonyl groups on the ligand. The axes of the polymeric chains in the adjacent layers run perpendicular to each other. This structural feature reinforces the structure.

D. Preparation of Co($Me_2Ac_2H_2$malen)(4-PyOLi)

Co($Me_2Ac_2H_2$malen)(4-PyOLi)(MeOH), prepared according to the method described in Example 1C, contains one methanol molecule per cobalt atom. In a glove box, the sample was placed in an Erlenmeyer flask and connected to a vacuum pump. The flask was heated to 75° C. in an oil bath for 3 hours to obtain Co($Me_2Ac_2H_2$malen)(4-PyOLi).

E. Isotherm for Co($Me_2Ac_2H_2$malen)(4-PyOLi)

A critical aspect to the practical application of oxygen selective adsorbents is the amount of oxygen that can be taken up under fixed conditions of temperature and pressure. This value is expressed in micro moles of oxygen per gram of solid (loading).

Figure 6:
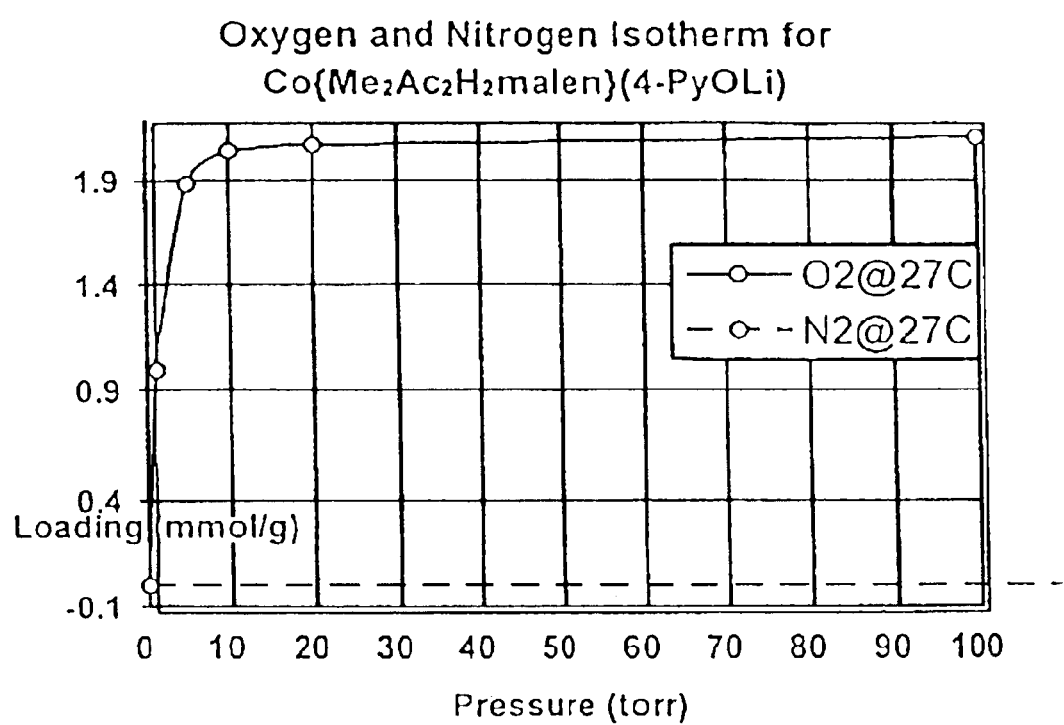
FIG. 6 is a graph of the oxygen and nitrogen isotherms for Co{Me$_2$Ac$_2$H$_2$malen}(4-PyOLi)

The oxygen and nitrogen isotherms for the complex prepared as described in Example 1D were determined on a pressure microbalance. Optimal sample performance requires minimal exposure to air. At 27° C., the sample shows an oxygen loading over 2.0 mmol/g under 10 torr of oxygen. The nitrogen loading at 10 torr is too small to measure accurately, but is only 0.012 mmol/g at 1000 torr. The loadings at various pressures corrected for buoyancy effects are listed in Table 1, and the isotherms for oxygen and nitrogen are shown in FIG. 6. The oxygen and nitrogen isotherms depict the gas loading capacity for a given adsorbent with respect to the partial pressure. They show the following features:

1) The oxygen affinity is very high with a half saturation pressure at 1 torr.
2) The oxygen loading is very high at low pressure (2.038 mmol/g at 10 torr).
3) The oxygen/nitrogen selectivity is higher (17,000 at 10 torr).

When exposed to 1 atm $O_2$, this sample shows a very fast oxygen adsorption rate (>8 mL/g/s). The results also indicate that the adsorbed oxygen can be completely removed by vacuum or pure nitrogen. However, due to high oxygen affinity, the desorption rate is slow. It takes 120 and 27 minutes to achieve 90% desorption at 27° C. and 47° C., respectively, The high oxygen affinity, high selectivity, and reversibility make this compound suitable for, but not limited to, removal of trace oxygen in a gaseous stream.

TABLE 1

Adsorption/Desorption Data for Co ($Me_2Ac_2H_2$malen) (4-PyOLi)

| Pressure (torr) | $O_2$ Loading (mmol/g) | $N_2$ Loading (mmol/g) |
|---|---|---|
| 0 | 0 | 0 |
| 1.13 | 1.001 | |
| 5 | 1.878 | |
| 10 | 2.038 | |
| 20 | 2.067 | |
| 100 | 2.108 | |
| 1000 | | 0.012 |

F. Surface Area and Porosity

A sample (0.383 g) of the complex prepared as described Example 1D was loaded into a tube in a glove box under an inert atmosphere. The tube was sealed and transferred to an Accelerated Surface Area and Porosimetry System (Model ASAP 2010 from Micrometrics). Carbon dioxide was used as a probe molecule and the adsorption and desorption of the probe molecule was determined at 195° K by a volumetric method on the instrument. The BET surface area was calculated to be 156(2) $m^2/g$. The Horvath-Kawazoe method was used to calculate the median pore diameter and maximum pore volume: 5.4 A and 0.080 $cm^3/g$.

Example 2

Co{$Me_2Ac_2H_2$ maltmen}(4-PyOLi)

A. Preparation of Co($Me_2Ac_2H_2$maltmen)

In a glove box under a nitrogen atmosphere, $H_2$($Me_2Ac_2H_2$maltmen) (0.396 g, 1.18 mmol) (prepared using methods well known to those skilled in the art) and Co($CH_3CO_2$)$_2$.4$H_2O$ (0.295 g, 1.18 mmol) were dissolved in 15 mL of methanol with heating and stirring. NaOH (0.092 g, 2.3 mmol) in 10 of mL of MeOH was added dropwise with stirring to obtain an orange solution. The solution was heated and stirred for another hour and then allowed to cool. The resulting precipitate was filtered, washed with MeOH, and dried under vacuum. Additional solid product was formed in the filtrate and was dissolved by heating, then solvent was slowly removed by evaporation to give plate-shaped crystals. These crystals were collected by filtration, washed with MeOH, and dried under vacuum. The total yield including both initial isolated solid and material isolated from filtrate: 0.27 g (0.94 mmol) or 80%.

B. Preparation of Co(Me$_2$Ac$_2$H$_2$maltmen)(4-PyOLi) (EtOH)

Co(Me$_2$Ac$_2$H$_2$maltmen) (0.18 g, 0.46 mmol) and the lithium salt of 4-hydroxypyridine (0.096 g, 0.95 mmol/g) were placed in a 4-Dram vial. Ethanol (10 mmol) was added to the vial and the mixture was heated with stirring. The resulting brown solution was slowly cooled to room temperature and then solvent was allowed to slowly evaporate in the glove box. After five days, the resulting solid was collected by filtration.

C. Preparation of Co(Me$_2$Ac$_2$H$_2$maltmen)(4-PyOLi)

The compound prepared according to the method described in Example 2B using EtOH solvent contained one ethanol molecule per cobalt. A sample of Co(Me$_2$Ac$_2$H$_2$maltmen)(4-PyOLi)(EtOH) was loaded onto a TGA instrument. The sample was heated to 90° C. at a heating rate of 0.1° C./min. Based on weight loss, all of the solvent was lost before the temperature reached 70° C. The weight loss was 8.7%, close to the theoretical loss of 8.5% to produce Co(Me$_2$Ac$_2$H$_2$maltmen)(4-PyOLi).

D. Isotherm for Co(Me$_2$Ac$_2$H$_2$maltmen)(4-PyOLi)

Figure 7:
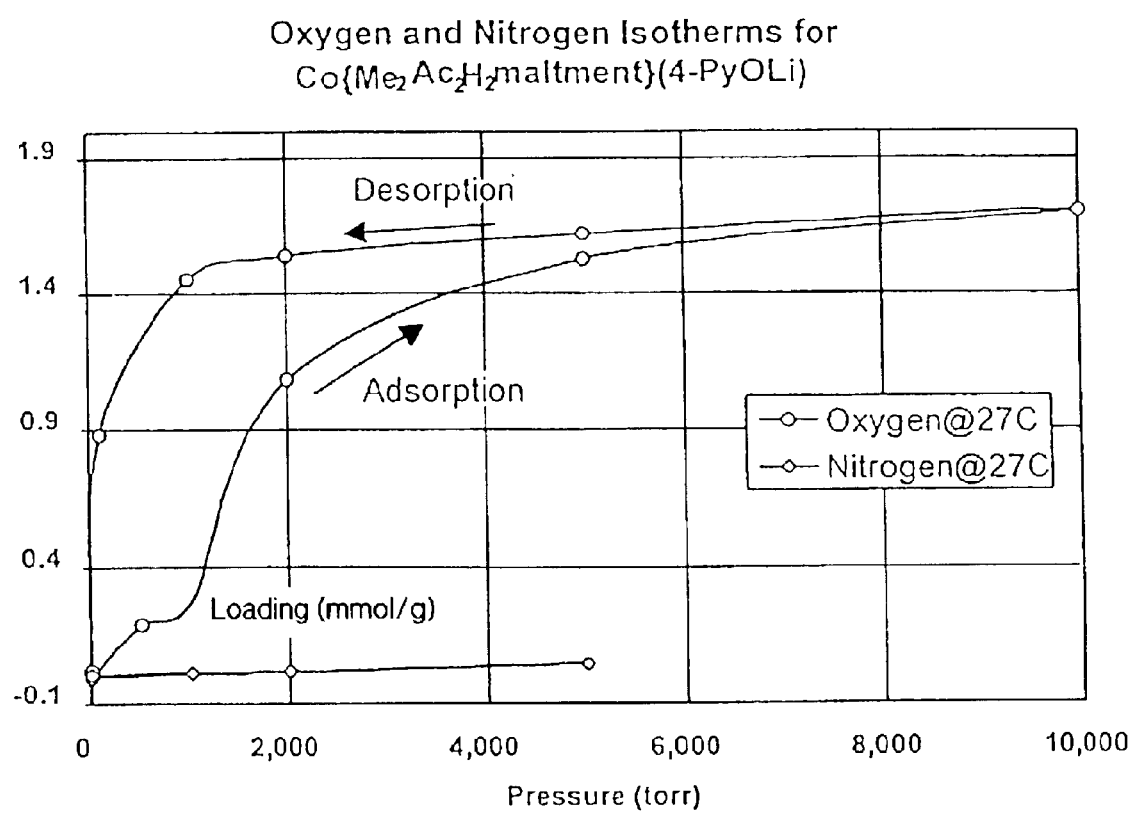
FIG. 7 is a graph of the oxygen and nitrogen adsorption and desorption isotherms for Co{Me$_2$Ac$_2$H$_2$malen}(4-PyOLi) at 27° C.

A sample of Co(Me$_2$Ac$_2$H$_2$maltmen)(4-PyOLi)(EtOH), prepared as described in Example 2B, was loaded on a pressure microbalance with limited exposure to air. The oxygen and nitrogen isotherms were determined at 27° C. The sample showed an oxygen loading of 1.70 mmol/g at 10,000 torr. In contrast, the nitrogen loading was very low. Under 5,000 torr of nitrogen, the nitrogen loading for the sample was 0.045 mmol/g. The loadings at various pressures are listed in Table 2 and the isotherms for oxygen and nitrogen are shown in FIG. 7. The oxygen and nitrogen isotherms indicate that this sample can selectively adsorb oxygen and that the oxygen loading is high. In addition, the adsorbed oxygen can be fully desorbed under vacuum.

TABLE 2

Oxygen and Nitrogen Adsorption/Desorption Data for Co (Me$_2$Ac$_2$H$_2$maltmen) (4-PyOLi) at 27° C.

| Pressure (torr) | O$_2$ Loading (mmol/g) | N$_2$ Loading (mmol/g) |
|---|---|---|
| 0 | 0 | 0 |
| 500 | 0.193 | |
| 1000 | 0.263 | 0.011 |
| 2000 | 1.086 | 0.017 |
| 5000 | 1.526 | 0.045 |
| 10000 | 1.701 | |
| 5000 | 1.62 | |
| 2000 | 1.54 | 0.023 |
| 1000 | 1.455 | 0.017 |
| 100 | 0.883 | |
| 0 | 0.023 | 0.008 |

Figure 8:
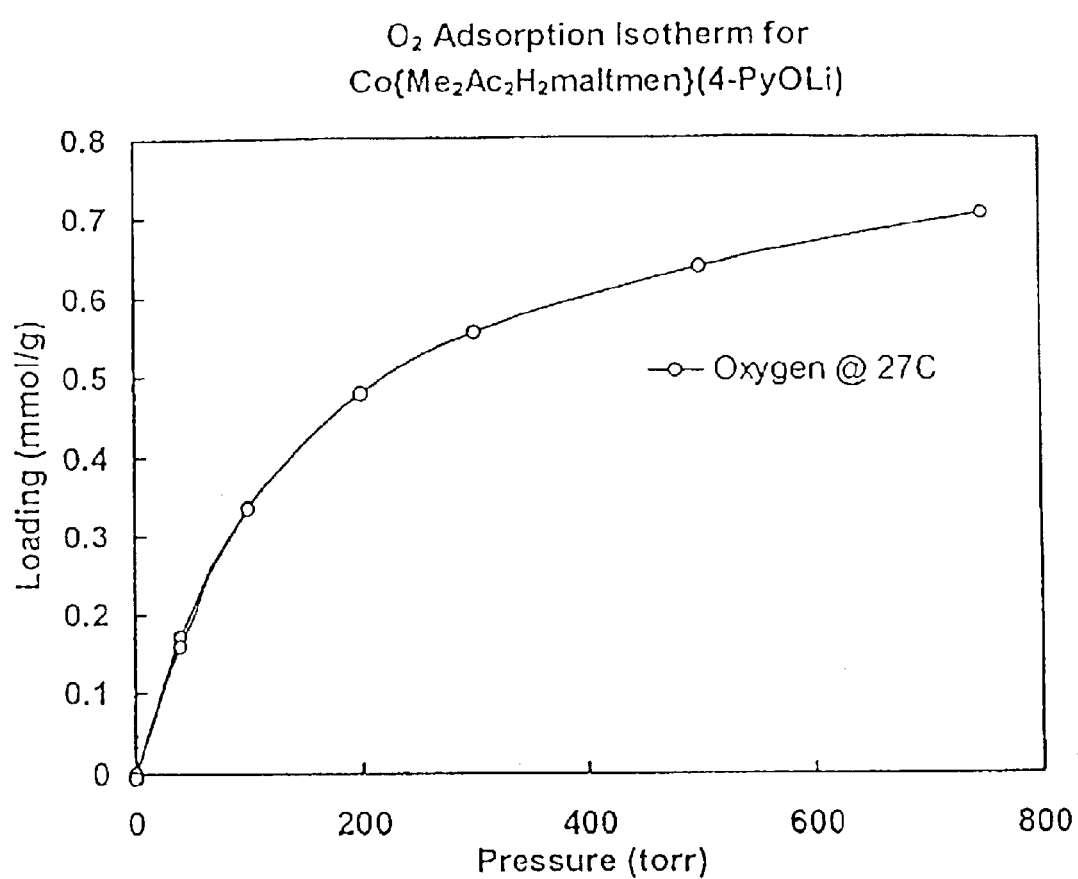
FIG. 8 is a graph of the oxygen adsorption isotherm for Co{Me$_2$Ac$_2$H$_2$maltmen}(4-PyOLi) at 27° C.

Exposure to high pressure oxygen changed the properties of the sample. A second oxygen isotherm was obtained following exposure to high pressure oxygen for a pressure range from 0–750 torr. The data are listed in Table 3, and the isotherm is plotted in FIG. 8. The change in behavior is consistent with a phase change, and no evidence was observed for conversion back to the initial (as prepared) phase. The oxygen and nitrogen isotherms have following significant features:

1) The oxygen adsorption is fully reversible.
2) The oxygen loading is reasonably high (>15 mL/g under 1 atm O$_2$).
3) The nitrogen loading is negligible.
4) The oxygen/nitrogen selectivity is very high, over 260 at 200 torr.
5) The curvature of the isotherms are suitable for application for bulk air separation.

The loading tests also showed that adsorption and desorption rates are fast. It takes less than a minute to reach 90% of equilibrium.

TABLE 3

Oxygen Adsorption/Desorption Data for Co (Me$_2$Ac$_2$H$_2$malen) (4-PyOLi) at 27° C.

| Pressure (torr) | O$_2$ Loading (mmol/g) |
|---|---|
| 0 | 0 |
| 40 | 0.171 |
| 100 | 0.339 |
| 200 | 0.483 |
| 300 | 0.557 |
| 500 | 0.640 |
| 750 | 0.705 |
| 500 | 0.638 |
| 300 | 0.557 |
| 200 | 0.481 |
| 100 | 0.334 |
| 40 | 0.158 |
| 0 | −0.006 |

E. Oxygen and Nitrogen Cycling for Co{Me$_2$Ac$_2$H$_2$maltmen)(4-PyOLi)

Figure 9:
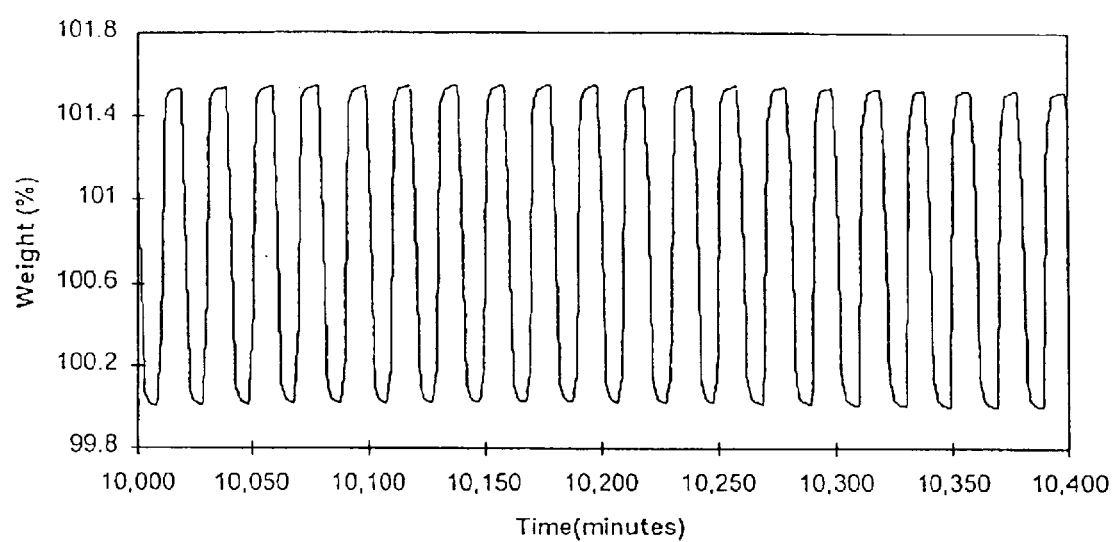
FIG. 9 is a section of a graph illustrating a TGA cycling experiment for Co{Me$_2$Ac$_2$H$_2$maltmen}(4-PyOLi)

A sample of the product described in Example 2C, exposed to high pressure oxygen to induce a phase change, was loaded onto a TGA system. The sample was cycled between oxygen and nitrogen with a 20-minute cycle time (10 minutes for oxygen and 10 minutes for nitrogen) at 27° C. Due to prolonged contact with ambient air, the oxygen loading was lower than that obtained on a microbalance. The sample was cycled between oxygen and nitrogen for 6,000 cycles and the performance decreased by 5%. Trace moisture in the gas stream was mainly, if not fully, responsible for the decay in performance. A section of the TGA cycling experiment is shown in FIG. 9. This oxygen/nitrogen cycling experiment shows the following significant features:

1) reversible adsorption of oxygen
2) fast adsorption and desorption rates (>2 mL/g/s when exposed to 700 torr oxygen);
3) reasonably high loading (>10 mL/g under 1 atm O$_2$); and
4) projected half life of 81,000 cycles.

F. Fine-tuning of Oxygen Isotherm for Co(Me$_2$Ac$_2$H$_2$maltmen)(4-PyOLi)

Figure 10:
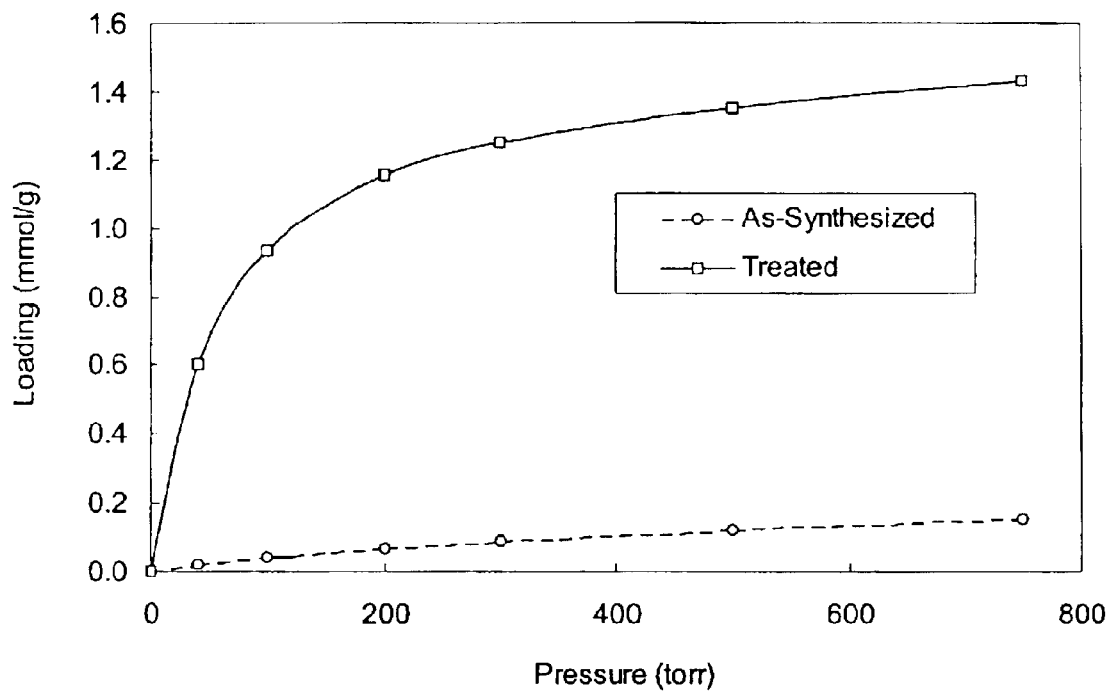
FIG. 10 illustrates oxygen isotherms for as-synthesized and treated Co(Me$_2$Ac$_2$H$_2$maltmen)(4-PyOLi)

Studies indicate that the oxygen loading at 1 bar can be increased not only by the treatment with high-pressure oxygen at ambient temperature but also by the treatment with 1 bar oxygen at low temperature. Studies also show that the magnitude of the increase in oxygen loading at 1 bar depends on the duration and number of the treatments. The increase in the oxygen loading at 1 bar results from a change of oxygen affinity, which shifts the oxygen isotherms towards the lower pressure region. The oxygen isotherms for two samples are shown FIG. 10. The lower curve was obtained from an as-synthesized sample without any pretreatment with oxygen while the upper curve was obtained from a sample which was treated with 1 bar oxygen at low temperature (0 to −50° C.) for 30 times. A desired shape of isotherm between the two extreme curves can be obtained by controlling the treatment conditions. The transformation of the sample was irreversible, at least on the time frame of months. A lifetime test was performed on one of the intermediate samples. The oxygen loading at 1 bar decreased from 1.03 to 0.87 mmol/g after cycling between nitrogen (10 minutes) and oxygen (10 minutes) for 70 days. Assuming that the decay is first order in the content of active material, the half lifetime was projected to be around 300 days.

Example 3

Co(Me$_2$Ac$_2$H$_2$maldmen)(4-PyOLi)

A. Preparation Co{Me$_2$Ac$_2$H$_2$maldmen}

In a glove box under a nitrogen atmosphere, Co(CH$_3$COO)$_2$.4H$_2$O (249 g, 1.00 mol) and the ligand (310 g, 1.006 mol), prepared by condensation of two equivalents of 3-ethoxymethylene-2,4-pentanedione with one equivalent of 2-methyl-1,2-diaminopropane, were added to methanol to obtain a suspension (1.3 L). The mixture was heated to near boiling for 1 hour, and some orange precipitate formed. NaOH (80.0 g, 2.0 mol) in 550 mL of MeOH was slowly added into the above solution under stirring over a period of 10 minutes. After addition of NaOH, the mixture was heated at 50° C. for 1.5 hour and then cooled to below 40° C. The supernatant was decanted, and the orange microcrystalline product was filtered, washed with MeOH (3×100 mL), and dried in the glove box. Weight: 349.98 g (0.96 mol). Yield: 96%.

B. Preparation of Co{Me$_2$Ac$_2$H$_2$maldmen}(4-PyOLi) (EtOH)

LiOH (0.5 g, 0.0209 mol) and 4-hydroxypyridine (2.00 g, 0.021 mol) were dissolved in 40 mL of EtOH with heating and stirring for 1 hour. Co{Me$_2$Ac$_2$H$_2$maldmen}(7.00 g, 0.0192 mol) was added into the solution. The beaker was covered and the mixture was stirred at 75° C. for 30 min and at 50° C. for 2.5 hours. The mixture was cooled to 30° C. The product was collected by filtration, washed with EtOH (2×5 mL), and dried in the glove box. Weight: 8.75 g (0.0171 mol). Yield: 89%.

C. Preparation of Co{Me$_2$Ac$_2$H$_2$maldmen}(4-PyOLi)

Sample prepared in Example 3C contains one molecule of solvent EtOH per cobalt atom. The solvent molecule can be removed by heating the sample under nitrogen or vacuum at 90° C. A sample (15.244 mg) was loaded onto a TGA sample pan. The furnace temperature was ramped to 90° C. at a heating rate of 2° C./min and kept at 90° C. for 2 hour before cooled to 27° C. The weight loss was 8.7%. The theoretical value is 9.0% for losing one EtOH molecule. The lower experimental value may result from the partial loss of the solvent molecule during the collection and storage of the sample.

D. Isotherms for Co(Me$_2$Ac$_2$H$_2$maldmen)(4-PyOLi)

Figure 11:
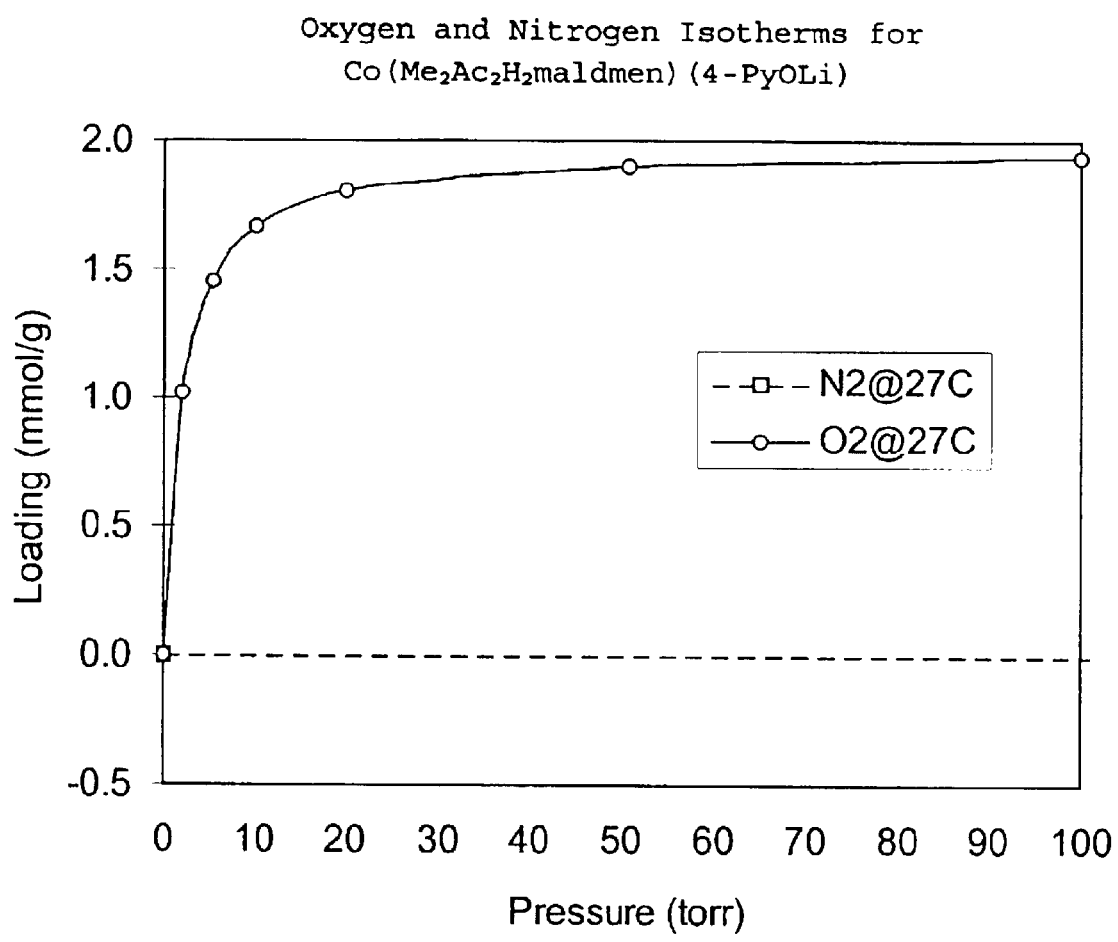
FIG. 11 is a graph of the oxygen and nitrogen isotherms for Co(Me$_2$Ac$_2$H$_2$maldmen)(4-PyOLi).

A sample of Co(Me$_2$Ac$_2$H$_2$maldmen)(4-PyOLi), prepared as described in Example 3C, was loaded on a pressure microbalance with limited exposure to air. The oxygen and nitrogen isotherms were determined at 27° C. The sample showed oxygen loadings of 1.021, 1.454, 1.668, 1.810, and 1.939 mmol/g at 2.11, 5.52, 10.11, 20, and 100 torr, respectively. In contrast, the nitrogen loading was very low. Under 1,000 torr, the nitrogen loading for the sample was 0.035 mmol/g. The oxygen and nitrogen isotherms are displayed in FIG. 11. The isotherms indicate that this sample has high oxygen loading and very high O$_2$/N$_2$ selectivity.

The oxygen and nitrogen adsorption curves show the following features:

1) The oxygen affinity is very high with a half saturation pressure at 2 torr.
2) The oxygen loading is very high at low pressure (1.81 mmol/g at 20 torr).
3) The oxygen/nitrogen selectivity is high (4,700 at 10 torr).

When exposed to 1 atm O$_2$, this sample shows a very fast oxygen adsorption rate (0.52 mmol/g/s or 12.6 mL/g/s). The results also indicate that the adsorbed oxygen can be completely removed by vacuum or pure nitrogen. The desorption rate is slower than that for Co(Me$_2$Ac$_2$H$_2$maltmen)(4-PyOLi) but much faster than that for Co(Me$_2$Ac$_2$H$_2$malen)(4-PyOLi). It takes 22 minutes to achieve 90% desorption at 27° C. The high oxygen affinity, high selectivity, and reversibility make this compound suitable for, but not limited to, removal of trace oxygen in a gaseous stream.

Example 4

Co(Me$_2$H$_2$H$_2$ malophen)/tricarbonyl/py

A. Preparation of Co(Me$_2$H$_2$H$_2$malophen)

A solution of o-phenylenediamine (8.15 g, 75 mmol) in chloroform (300 ml) was added dropwise over 2 hr to a solution containing two equivalents of 4-methoxy-3-buten-2-one (15.3 g, 153 mmol) in diethylether (50 ml) at 0° C. in an ice bath. When the addition was complete, the system was allowed to warm to room temperature, then left in a refrigerator for 2 days. The solvent was removed under reduced pressure to give a viscous oil that was used without purification. The oil was transferred to a glove box, then dissolved in methanol (400 ml). Cobalt(II) acetate tetrahydrate (18.7 g, 75 mmol) was added to give a solid mass and a brown solution, then a solution of sodium hydroxide (6.06 g, 152 mmol) in methanol (100 ml) was added over 3 minutes. After standing at room temperature for 2 days, the brown solid was collected by filtration and dried under vacuum, to give Co(Me$_2$H$_2$H$_2$malophen) (19.09 g) as a brown solid. This material was used without purification.

B. Preparation of Co(Me$_2$H$_2$H$_2$malophen)/tricarbonyl/py

A solution of 1,3,5-benzenetricarbonyl chloride (0.3279 g, 1.235 mmol) in toluene (20 ml) was added dropwise to a solution containing Co(Me$_2$H$_2$H$_2$malophen) (1.004 g, 3.333 mmol) and triethylamine (0.926 ml, 6.64 mmol) in toluene (70 ml). The mixture was then stirred at room temperature for 2 hr. Methanol (1.0 ml) was added to consume residual acid chloride groups, and the mixture was stirred overnight. The solution was concentrated to dryness under vacuum, then methanol (50 ml) was added to extract triethylamine hydrochloride and the system was stirred for one hour. The product was isolated by filtration as a brown powder, then dried under vacuum, yield 0.4119 g. The BET surface area for this product following activation at 50° C. under vacuum was 46 m$^2$/g. In order to convert the solid to an active form, the solid was treated with pyridine. The isolated solid (0.15 g) was treated with pyridine (4 drops) using vapor diffusion in a sealed vessel (rather than direct liquid contact) over several days to yield Co (Me$_2$H$_2$H$_2$malophen)/tricarbonyl/py.

C. Adsorption for Co(Me$_2$H$_2$H$_2$malophen)/tricarbonyl/py

Sorption studies were performed for Co (Me$_2$H$_2$H$_2$malophen)/tricarbonyl/py using a pressure microbalance at 27° C.; the data are presented in Table 4. Data for nitrogen are reported after 15 minutes which essentially reflected equilibrium loadings. Oxygen data were reported after 60 minutes and are not at equilibrium. For example, at 20000 torr oxygen, the oxygen loading climbed to 1.853 mmol/g after 900 minutes. The oxygen did not fully desorb even with heating under vacuum for several days. The residual oxygen loading is 0.804 mmol/g.

The oxygen and nitrogen loading tests shows that this sample selectively adsorbs oxygen and the oxygen loading is high. However, the sorption is slow and oxygen cannot be fully desorbed with heat and vacuum.

TABLE 4

Oxygen and Nitrogen Adsorption/Desorption Data for Co (Me$_2$H$_2$H$_2$malophen)/tricarbonyl/py at 27° C.

| Pressure (torr) | O$_2$ Loading (mmol/g) | N$_2$ Loading (mmol/g) |
|---|---|---|
| 0 | 0 | 0 |
| 1000 | 0.261 | 0 |
| 2000 |  | 0.016 |
| 5000 | 0.686 |  |
| 10000 | 1.016 | 0.064 |
| 20000 | 1.255 | 0.102 |
| 0 | 0.804 | 0 |

Example 5

Co(Me$_2$H$_2$H$_2$ malophen)/tricarbonyl/ teraphthaloyl/py

A. Preparation of Co(Me$_2$H$_2$H$_2$malophen)/tricarbonyl/ terephthaloyl/py

A solution of Co(Me$_2$H$_2$H$_2$malophen) (1.001 8 g, 3.32 mmol) in toluene (75 ml) was prepared with mild heating, then triethylamine (0.926 ml, 6.64 mmol) was added. A solution containing terephthaloyl chloride (0.3369 g, 1.66 mmol) and 1,3,5-benzenetricarbonyl chloride (0.2947 g, 1.11 mmol) in toluene (25 ml) was added dropwise. The mixture was then stirred at room temperature for one hour. Methanol (1.0 ml) was added to consume residual acid chloride groups, then the mixture was stirred overnight. The solution was concentrated to dryness under vacuum, then methanol (40 ml) was added to extract triethylamine hydrochloride and the system was stirred for one hour. The product was isolated by filtration as a brown powder then dried under vacuum. The BET surface following activation at 200° C. under vacuum is 51 m$^2$/g. In order to convert the solid to an active form, the solid was treated with pyridine. The isolated solid (0.1750 g) was treated with pyridine (7 drops) using vapor diffusion in a sealed vessel (rather than direct liquid contact) over several days to yield Co (Me$_2$H$_2$H$_2$malophen)/tricarbonyl/terephthaloyl/py.

B. Adsorption of Co(Me$_2$H$_2$H$_2$malophen)/tricarbonyl/ terephthaloyl/py

Sorption studies were performed for Co(Me$_2$H$_2$H$_2$malophen)/tricarbonyl/terephthaloyl/py using a pressure microbalance at 0° C. and the data are presented in Table 5. Data for nitrogen are reported after 15 minutes which essentially reflected equilibrium loadings. Oxygen data are reported after 60 minutes, being close to equilibrium values. The oxygen almost fully desorbed under vacuum with heating to 50° C. for a short period. The oxygen and nitrogen loading tests indicate that this sample can selectively adsorb oxygen and the oxygen can be fully desorbed although the sorption/desorption rate is slow and desorption requires heating.

TABLE 5

Oxygen and Nitrogen Adsorption/Desorption Data for Co (Me$_2$H$_2$H$_2$malophen)/tricarbonyl/terephthaloyl/py at 0° C.

| Pressure (torr) | O$_2$ Loading (mmol/g) | N$_2$ Loading (mmol/g) |
|---|---|---|
| 0 | 0 | 0 |
| 1000 | 0.363 | 0 |
| 5000 | 0.746 |  |
| 10000 | 0.981 | 0.011 |
| 20000 | 1.134 | 0 |
| 0 | 0.036 | −0.007 |

Example 6

Co(Me$_2$H$_2$H$_2$ malophen)/tricarbonyl/oxalyl/py

A. Preparation of Co(Me$_2$H$_2$H$_2$malophen)/tricarbonyl/ oxalyl/py

A solution of Co(Me$_2$H$_2$H$_2$malophen) (1.006 g, 3.32 mmol) was prepared in toluene (75 ml) with mild heating, then triethylamine (1.11 ml, 7.96 mmol) was added. 2.0 M oxalyl chloride in dichloromethane (1.60 ml, 3.2 mmol) was combined with 1,3,5-benzenetricarbonyl chloride (0.1429 g, 5.38 mmol) in toluene (25 ml), then the mixture was added dropwise to the solution containing Co(Me$_2$H$_2$H$_2$malophen) and triethylamine. The mixture was then stirred at room temperature for one hour. Methanol (1.0 ml) was added to consume residual acid chloride groups, and the mixture was stirred overnight. The solution was concentrated to dryness under vacuum, then methanol (40 ml) was added to extract triethylamine hydrochloride and the system was stirred for one hour. The product was isolated by filtration as a brown powder then dried under vacuum. The BET surface area of this product following activation at 50° C. under vacuum is 49 m$^2$/g. In order to convert the solid to an active form, the solid was treated with pyridine. Isolated solid (0.18 g) was treated with pyridine (7 drops) using vapor diffusion in a sealed vessel (rather than direct liquid contact) over several days to yield Co(Me$_2$H$_2$H$_2$malophen)/tricarbonyl/oxalyl/py.

B. Adsorption for Co(Me$_2$H$_2$H$_2$malophen)/tricarbonyl/ oxalyl/py

Adsorption studies were performed for Co(Me$_2$H$_2$H$_2$malophen)/tricarbonyl/oxalyl/py using a pressure microbalance at 0° C. and the data are presented in Table 6. Data for nitrogen are reported after 15 minutes which essentially reflected equilibrium loadings. Oxygen data are reported after 60 minutes and are not at equilibrium. For example, at 20000 torr oxygen, the oxygen loading climbed to 0.852 mmol/g after 900 minutes. Oxygen desorption required heating to 50° C. under vacuum, and the residual oxygen loading was 0.051 mmol/g. The oxygen and nitrogen loading tests show that this sample can selectively adsorb oxygen with modest loadings. However, the sorption rate is slow and full desorption requires heating.

TABLE 6

Oxygen and Nitrogen Adsorption/Desorption Data for Co (Me$_2$H$_2$H$_2$malophen)/tricarbonyl/oxalyl/py at 0° C.

| Pressure (torr) | O$_2$ Loading (mmol/g) | N$_2$ Loading (mmol/g) |
|---|---|---|
| 0 | 0 | 0 |
| 1000 | 0.158 | 0 |

TABLE 6-continued

Oxygen and Nitrogen Adsorption/Desorption Data for
Co (Me$_2$H$_2$H$_2$malophen)/tricarbonyl/oxalyl/py at 0° C.

| Pressure (torr) | O$_2$ Loading (mmol/g) | N$_2$ Loading (mmol/g) |
|---|---|---|
| 2000 | | 0.048 |
| 5000 | 0.363 | |
| 10000 | 0.537 | 0.18 |
| 20000 | 0.738 | 0.282 |
| 0 | 0.051 | 0 |

The adsorbents of the present invention may be used in separations or enrichments of fluid mixtures containing oxygen. For example, processes based on oxygen-selective adsorbent would allow air separation to produce either nitrogen or oxygen or both. In addition, the materials of the present invention may be used in the enrichment of air with either nitrogen or oxygen. In another embodiment, an oxygen-selective adsorbent could be employed for oxygen removal from other fluids (gases and/or liquids) including mixtures with nitrogen and argon, where oxygen is a minor or trace compound by contacting those fluids with the adsorbent.

Oxygen-selective adsorbents of the invention may also be utilized for catalytic applications, particularly oxygen activation for the partial oxidation or selective oxidation of organic substrates. The adsorbents of the invention may also be used to separate CO from mixtures of other fluids including CO.

Since these and other changes may be made in the process and compositions described hereinabove without departing from the present invention, it is intended that the scope of the invention should be determined from the claims appended hereto.

What is claimed is:

1. A process for selectively adsorbing a component of a gas mixture, which comprises contacting the mixture with a solid state, selective adsorbent material comprising a porous framework of a plurality of transition element complexes (TECs) having the formula shown below;

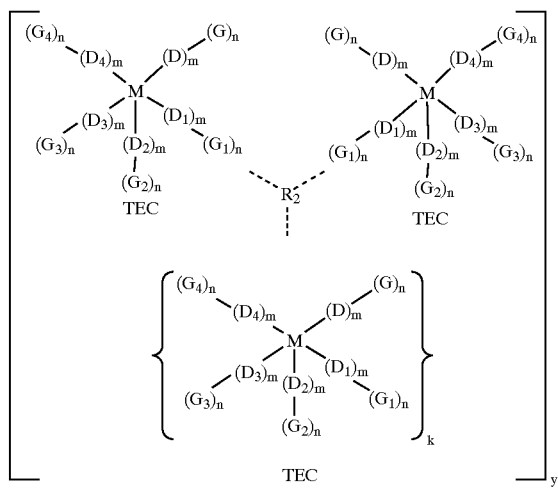

wherein:
(a) M is a primary transition metal ion;
(b) D to D$_4$ are primary donors and m is zero or one, at least three of D to D$_4$ occupying primary donor coordination sites on M but leaving at least one open coordination site on M for the component to react with M;
(c) G to G$_4$ are functional groups and n is zero or one, at least one of G to G$_4$ being intramolecularly bonded to at least three adjacent primary donors to form at least one 5 or 6 member chelate ring on the primary transition metal ion and providing at least three donors thereto;
(d) M, D to D$_4$ and G to G$_4$ together define one or more transition metal complexes, wherein said complexes are the same or different and wherein k is from 0 to 4;
(e) R is an intermolecular connecting group selected from
  (i) secondary metal ions coordinated with secondary donors bonded to one or more of groups G to G$_4$ on the respective TECs;
  (ii) multifunctional organic groups forming covalent bonds with one or more of groups G to G$_4$ on the respective TECs; or
  (iii) non-coordinating counter-ions spaced between and separating the respective TECs;
wherein z is from 1 to 8, and wherein R may be the same or different when z is greater than 1; and
(f) y is an integer sufficient to provide said porous framework of the plurality of TECs for the selective adsorption of the desired component thereon.

2. The process of claim 1 for selectively adsorbing a component of a gas mixture, wherein said transition metal ion M is an element selected from the first, second or third row of transition metals of the Periodic Table and the lanthanides.

3. The process of claim 1 for selectively adsorbing a component of a gas mixture, wherein the donors D to D$_4$ are N, O, S, C, P, Cl, F, or Br, and may be neutral or charged.

4. The process of claim 1 for selectively adsorbing a component of a gas mixture, wherein G to G$_4$ may be the same or different and are:
 a) pyridinyl or imidazolyl groups;
 b) amino groups having the formula —NR$^1$R$^2$R$^3$;
 c) imino groups having the formula —R$^1$N=CR$^2$R$^3$ or —N=CR$^1$R$^2$;
 d) carbonyl groups having the formula —R$^1$C(O)R$^2$, —R$^1$CONR$^2$R$^3$ or —R$^1$CO$_2$R$^2$;
 e) cyano groups having the formula —R$^1$—CN;
 f) nitro groups having the formula —R$^1$—NO$_2$;
 g) phenolate groups with up to five substituents selected from halogens or —R$^1$;
 h) carboxylate groups having the formula —R$^1$CO$_2$—; and
 i) alkoxy groups having the formula —R$^1$O$^-$; wherein R$^1$, R$^2$ and R$^3$ are the same or different and are substituted or unsubstituted acyclic or carbocyclic groups, or substituted by F, Cl, Br, O, N, P, S, Si or B.

5. The process of claim 1 for selectively adsorbing a component of a gas mixture, wherein R is a member of group (i) and has the structure

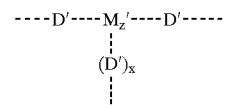

wherein D' is a secondary donor or a group of 2 to 4 secondary donors bonded to at least a G to G$_4$ group or a chelate ring on a coordination site on M and may also bond to an adjacent R group within the pourous framework; and M' is a secondary metal ion coordinated with secondary donors D', x is from 0 to 6 and z is from 1 to 8; said structure bonding the respective TECs to one another to form said porous framework.

6. The process of claim 5 for selectively adsorbing a component of a gas mixture, wherein the TECs are Co(Me₂Ac₂H₂malen)(4-Py-O⁻).

7. The process of claim 5 for selectively adsorbing a component of a gas mixture, wherein the TECs are Co(Me₂Ac₂H₂maltmen)(4-Py-O⁻).

8. The process of claim 1 for selectively adsorbing a component of a gas mixture, wherein R is a member of group (ii) and has the formula

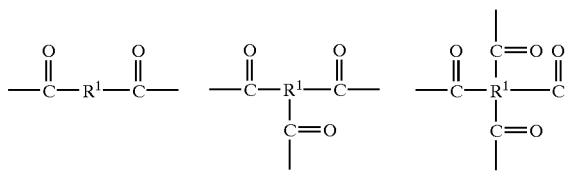

or mixtures thereof, and wherein $R^1$ is a substituted or unsubstituted acyclic or carbocyclic group and is unsubstituted or is substituted by F, Cl, Br, O, N, P, S, Si or B.

9. The process of claim 8 for selectively adsorbing a component of a gas mixture, wherein the TEC is Co(Me₂H₂H₂malophen)Py.

10. A process for selectively adsorbing a component of a gas mixture, which comprises contacting the mixture with a solid state, selective adsorbent material comprising a porous framework of a plurality of transition element complexes (TECs) having the formula shown below;

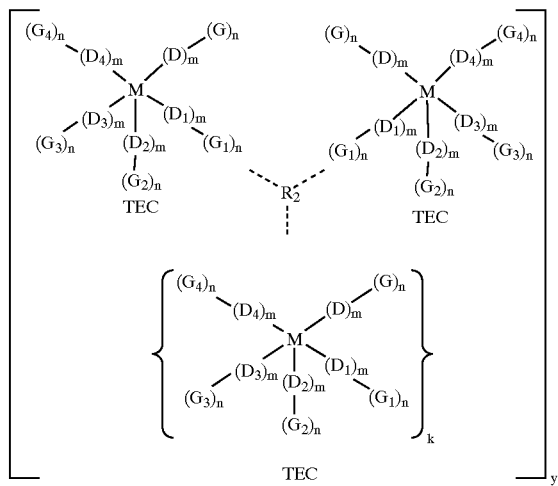

wherein:
(a) M is a primary transition metal ion;
(b) D to $D_4$ are primary donors and m is zero or one, at least three of D to $D_4$ occupying primary donor coordination sites on M but leaving at least one open coordination site on M for the component to react with M;
(c) G to $G_4$ are functional groups and n is zero or one, at least one of G to $G_4$ being intramolecularly bonded to at least three adjacent primary donors to form at least one 5 or 6 member chelate ring on the primary transition metal ion and providing at least three donors thereto:

(d) M, D to $D_4$ and G to $G_4$ together define one or more transition metal complexes, wherein said complexes are the same or different and wherein k is from 0 to 4; and (e) selectively adsorbing a component of a gas mixture, wherein R is a member of group (iii) and is selected from:
  (i) an amido group having the formula $R^1CONR^2$—;
  (ii) an amino group having the formula $R^1R^2n$—;
  (iii) a carbinol group having the formula —$R^1OH$; or
  (iv) a carboxylic acid group having thin formula —$R^1CO_2H$,
wherein $R^1$ and $R^2$ are the same or different and are unsubstituted acyclic or carbocyclic groups, or substituted acyclic or carbocyclic groups substituted by F, Cl, Br, O, N, P, S, Si or B.

11. The process of claim 1 for selectively adsorbing a component of a gas mixture, wherein R is a member of group (iv), selected from:
  (a) an alkylammonium or arylammonium cation having the formula —$(R^1R^2R^3R^4)N^+$, wherein $R^1R^2R^3$ and $R^4$ are the same or different and are hydrogen and at least one of which is an unsubstituted acyclic or carbocyclic group or an acyclic or carbocyclic group substituted by F, Cl, Br, O, N, P, S, Si or B when the TECs are anionic; or
  (b) $BF_4$—, BOR", $PF_6$—, $NO_3$—, $SO_4^{2-}$, $CO_3^{2-}$, $MoO_4^{2-}$, a polyoxometallate, R"$CO_2$—, R"O—, R"$SO_3$—, wherein R" is a $C_{1-20}$ alkyl or an aryl or hetero group having from 4 to 20 carbon atoms, when the TECs are cationic.

12. A process for selectively adsorbing oxygen from a gas mixture, which comprises contacting the mixture with a solid state, selective adsorbent material comprising a porous framework of a plurality of transition element complexes (TECs) having the formula shown below;

(a) M is a primary transition metal ion selected from Co(II), Fe(II) or Mn(II);
(b) D to $D_4$ are primary donors occupying primary donor coordination sites on M but leaving one open coordination site on M for an oxygen molecule to react with M;
(c) G to $G_4$ are functional groups and n is zero or one, at least one of G to $G_4$ being intramolecularly bonded to at least three adjacent primary donors to form at least one 5 or 6 member chelate ring on the primary transition metal ion and providing at least three donors thereto;

(d) M, D to $D_4$ and G to $G_4$ together define one or more transition metal complexes TEC A, TEC B and TEC C, wherein said complexes are the same or different;

(e) D' is a secondary donor or a group of secondary donors bonded to a chelate ring on a coordination site on M;

(f) M' is a secondary metal ion coordinated with secondary donors D',

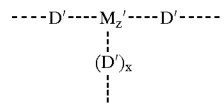

the group bonding the respective TECs to one another to maintain them in a porous framework and wherein z is from 1 to 8 and x is from 0 to 6; and (g) y is an integer sufficient to provide said porous framework of the plurality of TECs for the selective adsorption of oxygen thereon.

13. A process for selectively adsorbing a component of a gas mixture, which comprises contacting the mixture with a solid state, selective adsorbent material comprising a porous framework of a plurality of transition element complexes (TECs) having the formula shown below;

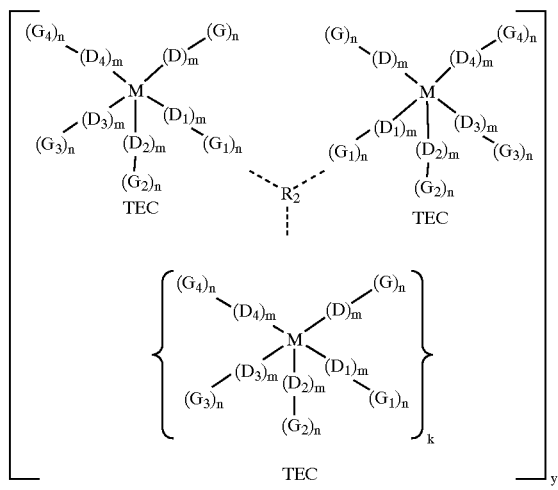

wherein:
(a) M is a primary transition metal ion;
(b) D to $D_4$ are primary donors and m is zero or one, at least three of D to $D_4$ occupying primary donor coordination sites on M but leaving at least one open coordination site on M for the component to react with M;
(c) G to $G_4$ are functional groups and n is zero or one, at least one of G to $G_4$ being intramolecularly bonded to at least three adjacent primary donors to form at least one 5 or 6 member chelate ring on the primary transition metal ion and providing at least three donors thereto;
(d) M, D to $D_4$ and G to $G_4$ together define one or more transition metal complexes, wherein said complexes are the same or different and wherein k is from 0 to 4;
(e) R is an intermolecular connecting group selected from
    (i) secondary metal ions coordinated with secondary donors bonded to one or more of groups G to $G_4$ on the respective TECs;
    (ii) multifunctional organic groups forming covalent bonds with one or more of groups G to $G_4$ on the respective TECs;
    (iii) non-coordinating counter-ions spaced between and separating the respective TECs;

wherein z is from 1 to 8, and wherein R may be the same or different when z is greater than 1; and (f) y is an integer sufficient to provide said porous framework of the plurality of TECs for the selective adsorption of the desired component thereon.

14. The process of claim 13 for selectively adsorbing a component of a gas mixture, wherein R is a member of group (i) and has the structure

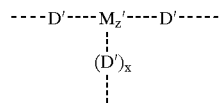

wherein D' is a secondary donor or a group of two to four secondary donors bonded to a chelate ring on a coordination site on M but may also bond to an adjacent R group within the porous framework; end M' is a secondary metal ion coordinated with secondary donors D', wherein z is from 1 to 8 and x is from 0 to 6; said structure bonding the respective TECS to one another to form said porous framework.

15. The process of claim 14 for selectively adsorbing a component of a gas mixture, wherein the TECs are Co(Me$_2$Ac$_2$H$_2$malen)(4Py-O$^-$) or Co(Me$_2$Ac$_2$H$_2$maltmen)(4Py-O$^-$).

16. The process of claim 13 for selectively adsorbing a component of a gas mixture, wherein R is a member of group (ii) and has the formula

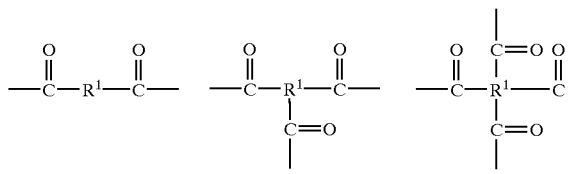

or mixtures thereof, wherein $R^1$ is a substituted or unsubstituted acyclic or carbocyclic group and is unsubstituted or is substituted by F, Cl, Br, O, N, P, S, Si or B.

17. The process of claim 16 for selectively adsorbing a component of a gas mixture, wherein the TECs are Co(Me$_2$H$_2$H$_2$malophen)Py.

18. The process of claim 16 for selectively adsorbing a component of a gas mixture, wherein the TECs are Co(Me$_2$H$_2$H$_2$maltmen)(4-PyOLi).

19. The process of claim 16 for selectively adsorbing a component of a gas mixture, wherein the TECs are Co(Me$_2$H$_2$H$_2$maldmen)(4-PyOLi).

20. A composition for selectively adsorbing a component of a gas mixture which comprises a solid state, selective adsorbent material comprising a porous framework of a plurality of transition element complexes (TECs) having the formula shown below:

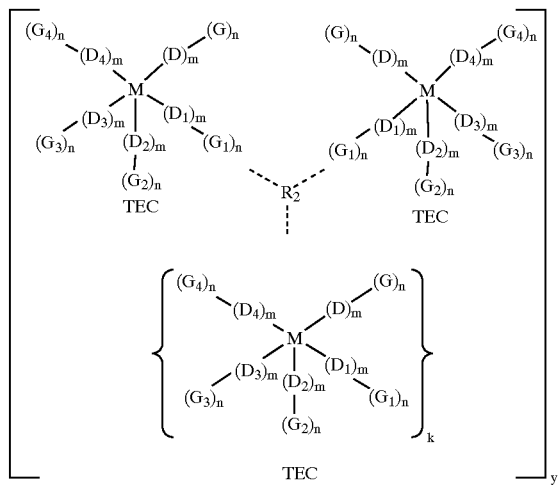

wherein
(a) M is a primary transition metal ion;
(b) D to $D_4$ are primary donors and m is zero or one, at least three of D to $D_{04}$ occupying primary donor coordination sites on M but leaving at least one open coordination site on M for the component to react with M;
(c) G to $G_4$ are functional groups and n is zero or one, at least one of G to $G_4$ being intramolecularly bonded to at least three adjacent primary donors to form at least one 5 or 6 member chelate ring on the primary transition metal ion and providing at least three donors thereto;
(d) M, D to $D_4$ and G to $G_4$ together define one or more transition metal complexes, wherein said complexes are the same or different and wherein k is from 0 to 4;
(e) R is a member of group (iii) and is selected from:
   (i) an amido group having the formula $R^1CONR^2$—;
   (ii) an amino group having the formula $R^1R^2n$—;
   (iii) a carbinol group having the formula —$R^1OH$; or
   d) a carboxylic acid group having the formula —$R^1CO^2H$,
wherein $R^1$ and $R^2$ are the same or different and are unsubstituted acyclic or carbocyclic groups, or substituted acyclic or carbocyclic groups substituted by F, Cl, Br, O, N, P, S, Si or B.

21. The process of claim 13 for selectively adsorbing a component of a gas mixture, wherein R is a member of group (iv), selected from:

(a) an alkylammonium or arylammonium cation having the formula —$(R^1R^2R^3R^4)N^+$, wherein $R^1$, $R^2$, $R^3$ and $R^4$ are the same or different and are hydrogen and at least one of which is an unsubstituted acyclic or carbocyclic group or an acyclic or carbocyclic group substituted by F, Cl, Br, O, N, P, S, Si or B when the TECs are anionic; or (b) $BF_4$—, $BOR''$—, $PF_6$—, $NO_3$—, $SO_4^{2-}$, $Co_3^{2-}$, $MoO_4^{2-}$, a polyoxometallate, $R''CO_2$—, $R''O$—, $R''SO_3$—, wherein $R''$ is a $C_{1-20}$ alkyl or an aryl or hetero group having from 4 to 20 carbon atoms, when the TECs are cationic.

22. The process of claim 1 for selectively adsorbing a component of a gas mixture, wherein said TECs are $Co(Me^2H^2H^2maldmen)$ (4-PyOLi).

23. The process of claim 1, wherein R is a member of group (i), and said secondary metal ions are selected from the group consisting of: Li+, Na+; K+, Rb+, Cs+, $Be^{2+}$, $Mg^{2+}$, $Ca^{2+}$, $Sr^{2+}$, $Ba^{2+}$, $B^{3+}$, $Al^{3+}$, $Ga^{3+}$, $In^{3+}$, $Tl^{3+}$, $Sn^{2+}$, $Sn^{4+}$, $Pb^{2+}$, $Sb^{4+}$, $Sc^{3+}$, $Tl^{3+}$, $V^{3+}$, $Cr^{3+}$, $Mn^{2+}$, $Fe^{2+}$, $Co^{2+}$, $Ni^{2+}$, $Cu^{2+}$, $Zn^{2+}$, $Y^{3+}$, $Ru^{3+}$, $Pd^{2+}$, $Ag^+$, $Cd^{2+}$, lanthanides, $Pt^{2+}$, $Au^{3+}$ and $Hg^{2+}$.

24. The process of claim 22, wherein R is a member of group (i), and said secondary donors are selected from the group consisting of: O, N, S, Cl, F, Br, I, C, and P.

25. The process of claim 12, said secondary metal ion is selected from the group consisting of: $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $B^{3+}$, $Al^{3+}$, $Ga^{3+}$, $In^{3+}$, $Tl^{3+}$, $Sn^{2+}$, $Sn^{4+}$, $Pb^{2+}$, $Sb^{4+}$, $Sc^{3+}$, $Ti^{3+}$, $V^{3+}$, $Cr^{3+}$, $Mn^{2+}$, $Fe^{2+}$, $Co^{2+}$, $Ni^{2+}$, $Cu^{2+}$, $Zn^{2+}$, $Y^{3+}$, $Ru^{3+}$, $Pd^{2+}$, $Ag^+$, $Cd^{2+}$, lanthanides, $Pt^{2+}$, $Au^{3+}$, and $Hg^{2+}$.

26. The process of claim 24 said secondary donor is selected from the group consisting of: O, N, S, Cl, F, Br, I, C, and P.

27. The process of claim 13, wherein R is a member of group (i), and said secondary metal ions are selected from the group consisting of: $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $B^{3+}$, $Al^{3+}$, $Ga^{3+}$, $In^{3+}$, $Tl^{3+}$, $Sn^{2+}$, $Sn^{4+}$, $Pb^{2+}$, $Sb^{4+}$, $Sc^{3+}$, $Ti^{3+}$, $V^{3+}$, $Cr^{3+}$, $Mn^{2+}$, $Fe^{2+}$, $Co^{2+}$, $Ni^{2+}$, $Cu^{2+}$, $Zn^{2+}$, $Y^{3+}$, $Pd^{2+}$, $Ag^+$, $Cd^{2+}$, lanthanides, $Pt^{2+}$, $Au^{3+}$ and $Hg^{2+}$.

28. The process of claim 26, wherein R is a member of group (i), and said secondary donors are selected from the group consisting of: O, N, S, Cl, F, Br, I, C, and P.

* * * * *